United States Patent
Kado et al.

(10) Patent No.: US 7,063,067 B2
(45) Date of Patent: Jun. 20, 2006

(54) INTAKE AIR CONTROL APPARATUS FOR INTERNAL COMBUSTION ENGINE

(75) Inventors: Hiroyuki Kado, Oobu (JP); Hiroshi Tanimura, Kariya (JP); Tsuyoshi Arai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/171,302

(22) Filed: Jul. 1, 2005

(65) Prior Publication Data
US 2006/0005809 A1    Jan. 12, 2006

(30) Foreign Application Priority Data
Jul. 6, 2004    (JP)    ............... 2004-199198

(51) Int. Cl.
*F02D 11/10*    (2006.01)
(52) U.S. Cl. .................................... 123/399
(58) Field of Classification Search ............. 123/361, 123/396, 399
See application file for complete search history.

(56) References Cited

U.S. PATENT DOCUMENTS

| 5,492,097 A | 2/1996 | Byram et al. ............... 123/396 |
| 6,640,776 B1 * | 11/2003 | Torii ............................ 123/396 |
| 6,912,994 B1 * | 7/2005 | Ozeki et al. ................. 123/399 |

FOREIGN PATENT DOCUMENTS

| JP | 2002-256894 | 9/2002 |
| JP | 2004-144039 | 5/2004 |

* cited by examiner

*Primary Examiner*—Tony M. Argenbright
(74) *Attorney, Agent, or Firm*—Nixon & Vanderhye P.C.

(57) ABSTRACT

An intake air control apparatus uses a male screw portion of an intermediate opening adjustment screw retractively screwed in a female screw hole of a sleeve nut fixedly held between fitting bosses. The intermediate opening degree adjustment screw can be thus held on a gear housing. Stress otherwise generated by forcing the male screw directly into a resin portion is prevented around or in the neighborhood of the female screw hole, i.e. the fitting bosses. The intermediary of the sleeve nut also increases the area of the resin portion receiving the shock load, thereby improving shock resistance.

8 Claims, 14 Drawing Sheets

INTAKE AIR CONTROL APPARATUS FOR INTERNAL COMBUSTION ENGINE

BACKGROUND OF THE INVENTION

1. Field of the Invention

This invention relates to an intake air control apparatus for an internal combustion engine mounted in an automotive vehicle or the like or, in particular, to an electronically controlled throttle control unit for driving a drive motor in accordance with the accelerator pedal angle set by the driver and thus controlling the rotational angle of the throttle valve of butterfly type rotatably accommodated in the throttle bore of the throttle body.

2. Description of the Related Art

In the prior art, an electronically controlled throttle control unit having the opener-side function has been proposed (see, for example, U.S. Pat. No. 5,492,097, pp. 1–9, FIGS. 1 to 9) wherein, in the case where the electric current to the drive motor is stopped for some reason, the throttle valve is kept at a predetermined intermediate position (also called the default opening degree of the throttle valve) between the closed-up position and the full-open position by use of different forces of a plurality of springs, thereby making possible a movement of the automotive vehicle to a refuge without immediately stopping the internal combustion engine.

In the conventional electronically controlled throttle control unit having the opener-side function to hold the throttle valve at the intermediate position in the case where the electric current to the drive motor is stopped for some reason, however, two lever members including an opener member and an intermediate stopper member and two spring members including a spring for the opener-side function and a spring for a return-side function are required. The larger number of component parts thus required inconveniently results in a high cost. Also, the use of a complicated configuration, wherein the intermediate stopper member in contact with the engaging portion of the throttle body sets the throttle valve at the intermediate position through a contact portion with the opener member, inconveniently changes the default opening degree of the throttle valve due to variations in parts tolerances.

To obviate these inconveniences, a single-coil spring structure for an opener mechanism of an electronically controlled throttle control unit having a simplified configuration with a fewer component parts has been proposed wherein, for the purpose of improving the opening degree position accuracy of the throttle valve at the intermediate position (also called the default position), as shown in FIG. 14, the coupling between a return spring 101 having the return-side function (hereinafter referred to as the return spring function) and a default spring 102 having the opener-side function (hereinafter referred to as the default spring function) is bent in the shape of a substantially inverted-U into a U-shaped hook portion 103, and the ends of the single-coil spring structure (including a first end of the return spring 101 and a second end of the default spring 102) are wound in different directions (see, for example, Japanese Unexamined Patent Publication No. 2002-256894, pp. 1–10, FIGS. 1 to 7) and Japanese Unexamined Patent Publication No. 2004-144039, pp. 1–15, FIGS. 1 to 5).

In the electronically controlled throttle control units described in the two patent publications described above, a power unit for driving a throttle valve 108 and a throttle shaft 109 accommodated openably in a throttle bore 105 of a throttle body 104 is configured of a drive motor 110 making up a drive source and a mechanical reduction gear for reducing the rotational speed of the drive motor 110 to a predetermined reduction ratio. The mechanical reduction gear includes a pinion 111 fixed on the motor shaft of the drive motor 110, an intermediate reduction gear 112 rotated in mesh with the pinion 111 and a valve gear 113 rotated in mesh with the intermediate reduction gear 112. The valve gear 113 is integrally coupled with a first axial end of the throttle shaft 109. Between the closed-up position (idle opening) and the intermediate position (default opening) of the throttle valve 108, the U-shaped hook portion 103 of a single coil spring is formed to engage the forward end of an intermediate opening degree adjustment screw 115 forced into a boss-shaped intermediate position stopper 114 formed integrally with the outer wall of the gear housing 107 of the throttle body 104. Reference numeral 121 designates a body-side hook, numeral 122 a gear-side hook, numeral 123 an anti-horizontal displacement guide, numeral 124 an engaging portion formed on the opener member 106, numeral 125 a body-side spring inner peripheral guide, and numeral 126 a gear-side spring inner peripheral guide.

In the electronically controlled throttle control units described in the two Japanese patent publications described above, however, the intermediate position stopper 114 of the gear housing 107 of the throttle body 104 includes the intermediate opening adjustment screw 115 for adjusting the intermediate position (default opening degree) of the throttle valve 108.

For the purpose of reducing the fuel consumption, weight and costs, as shown in FIGS. 9 to 13, the throttle body 104 and the sensor cover 127 are formed of resin, i.e. the throttle body 104 and the sensor cover 127 are formed of a resin material integrally with each other. A base hole (guide hole) having a circular cross section is formed in advance to guide the intermediate opening degree adjustment screw (tapping screw) 115 along the fastening direction, after which a fastening tool (hexagon nut) is engaged with a hexagon hole 116 at the head of the intermediate opening degree adjustment screw 115. In this way, the intermediate opening degree adjustment screw 115 is forced into the intermediate position stopper 114 by fastening (tapping) it to the intermediate position stopper 114. This process requires a very large fastening torque to be applied to the intermediate opening degree adjustment screw 115 in view of the fact that the diameter of the male screw of the intermediate opening degree adjustment screw 115 is larger than the inner diameter of the base hole and that the intermediate position stopper 114 has a large thickness to secure at least a certain degree of rigidity and strength.

As a result, the stress (internal distortion) caused by fastening (tapping) the intermediate opening degree adjustment screw 115 is left in the neighborhood of the base hole of the intermediate position stopper 114 of the gear housing 107, thereby sometimes reducing the rigidity and strength of the intermediate position stopper 114. Also, the resultant creep often reduces the axial fastening force of and loosens the intermediate opening degree adjustment screw 115. Further, each time the engine is stopped and power to the drive motor is switched off, a shock load from the U-shaped hook 103 of the coil spring is repeatedly exerted on the forward end corners of the intermediate opening degree adjustment screw 115 when the throttle valve 108 returns to the intermediate position (default opening degree) or when the opening of the throttle valve 108 is between the closed-up position (idle opening degree) and the intermediate position (default opening degree). Therefore, the intermediate position stopper 114 cannot firmly hold and fix the intermediate opening degree adjustment screw 115, thereby posing the problem that the throttle opening degree adjusting function (especially, the intermediate opening degree adjusting function) is adversely affected.

SUMMARY OF THE INVENTION

An object of this invention is to provide an intake air control apparatus for the internal combustion engine, which is capable of preventing stress (internal distortion) from being caused by the tapping around or in the neighborhood of the female screw hole for the throttle opening degree adjustment screw.

Another object of the invention is to provide an intake air control apparatus for the internal combustion engine, in which the shock resistance is improved for a higher reliability against a shock load which may be repeatedly exerted on the throttle opening degree adjustment screw.

According to one aspect of the invention, there is provided an intake air control apparatus for the internal combustion engine wherein, for the purpose of reducing the fuel consumption, the weight and the cost, at least the housing of the throttle body is formed of resin, or the housing cover is formed of resin in addition. In coupling the coupling end surface of the housing cover to the opening-side end surface of the housing of the throttle body, a sleeve nut having a female screw hole along the inner axis thereof is held between the opening-side end surface of the housing and the coupling end surface of the housing cover and, therefore, the sleeve nut is fixed at the same time simply by assembling the housing of the throttle body and the housing cover.

Without using the tapping process in which the throttle opening degree adjustment screw is forced directly into the housing formed of resin, therefore, the throttle opening degree adjustment screw can be held on the resin housing simply by being screwed retractively into the female screw hole of the sleeve nut. In view of the fact that the throttle opening degree adjustment screw is screwed retractively into the female screw hole of the sleeve nut, the stress (internal distortion) is prevented which otherwise might be caused by forcing the throttle opening degree adjustment screw directly into the resin portion in the conventional tapping process around or in the neighborhood of the female screw hole, i.e. at the coupling end surface of the housing cover and the opening-side end surface of the housing. Also, even in the case where the throttle opening degree adjustment screw is repeatedly subjected to the shock load from the contact portion of a coil spring or a rotational drive member, the increased area of the resin portion receiving the shock load improves the shock resistance for a higher reliability.

According to another aspect of the invention, there is provided an intake air control apparatus for the internal combustion engine, wherein the sleeve nut is held between the opening-side end surface of the housing and the coupling end surface of the housing cover in opposed relation to the contact portion while the throttle opening degree corresponding to the rotational angle of the throttle valve is within a set opening degree range, and the interior of the space communicates with the exterior thereof.

According to still another aspect of the invention, there is provided an intake air control apparatus for the internal combustion engine, wherein the throttle opening degree adjustment screw has a structure including a head adapted to engage the tool inserted in the female screw hole of the sleeve nut from outside the space and an axial portion extended from the head toward the contact portion along the axis, and wherein a male screw adapted to be screwed in the female screw hole of the sleeve nut is formed on the outer periphery of the axial portion of the throttle opening degree adjustment screw.

In this configuration, the tool is adapted to engage the head of the throttle opening degree adjustment screw and the male screw of the throttle opening degree adjustment screw is screwed into the female screw hole of the sleeve nut, while being fastened retractively. In this way, it is possible to change the extent to which the forward end of the axial portion of the throttle opening degree adjustment screw is protruded toward the contact portion from the end of the sleeve nut. Thus, the throttle valve opening degree corresponding to the rotational angle of the throttle valve can be adjusted to the set opening degree under a predetermined driving condition of the internal combustion engine (the closed-up opening degree at the closed-up position or the default opening degree (intermediate opening degree) while the vehicle is driven to the refuge or the internal combustion engine is stopped.)

According to yet another aspect of the invention, there is provided an intake air control apparatus for the internal combustion engine wherein, in accordance with the acceleration pedal angle set by the driver, the drive motor is activated and the output shaft thereof is rotated. The output shaft torque of the drive motor is transmitted to a valve gear constituting one of the component elements of the mechanical reduction gear. As a result, the valve gear rotates a rotational angle corresponding to the acceleration pedal angle set by the driver against the urging force of the coil spring. Thus, the throttle valve making up a rotary valve of butterfly type is opened from the closed-up position minimizing the intake air amount toward the full-open position maximizing the intake air amount. Then, the throttle bore having a circular cross section formed in the throttle bore portion of the throttle body is opened by a predetermined throttle opening degree, and the intake air amount flowing in the throttle bore is controlled. Thus, the engine speed is changed to a value corresponding to the acceleration pedal angle set by the driver.

According to a further aspect of the invention, there is provided an intake air control apparatus for the internal combustion engine, wherein in the case where the electric current flow to the drive motor is stopped for some reason, the throttle valve opening degree corresponding to the rotational angle of the throttle valve is held mechanically at the intermediate set opening degree between the closed-up position and the full-open position utilizing the different urging forces of the return spring and the default spring. Therefore, the internal combustion engine is not immediately stopped, and the movement of the vehicle to the refuge is made possible. At the same time, for example, the tool is engaged with the head of the intermediate opening degree adjustment screw and the male screw of the intermediate opening degree adjustment screw is screwed in the female screw hole of the sleeve nut while at the same time being retractively fastened. In this way, the amount can be changed by which the forward end of the axial portion of the intermediate opening degree adjustment screw is projected from the end of the sleeve nut toward the U-shaped hook (contact portion) constituting the coupling bent in the shape of inverted-U as a coupling between the return spring and the default spring. In this way, the throttle opening degree can be adjusted to the intermediate set opening degree (default opening) for the relief drive of the vehicle.

According to a still further aspect of the invention, there is provided an intake air control apparatus for the internal combustion engine, wherein the space formed between the housing of the throttle body and the housing cover for closing the opening of the housing makes up a spring chamber accommodating the coil spring, a gear chamber rotatably accommodating the gears of the mechanical reduction gear and a motor accommodating hole for accommodating and holding the drive motor. The housing cover is used as a sensor cover for fixedly holding the throttle opening degree sensor for detecting the throttle opening degree corresponding to the rotational angle of the throttle valve. As a result, a dust-proof or a water-proof structure can be formed simply by coupling, in air tight or liquid tight fashion, the opening-side end surface of the housing of the throttle body and the coupling end surface of the sensor cover. As a result, the malfunction or the operation failure of the coil spring, the gears of the mechanical reduction gear and the drive motor can be prevented while, at the same time, improving the reliability of the output of the throttle valve opening degree sensor.

According to a yet further aspect of the invention, there is provided an intake air control apparatus for the internal combustion engine, wherein a tool is engaged with the head of the closed-up opening degree adjustment screw and the male screw of the closed-up opening degree adjustment screw is screwed into the female screw hole of the sleeve nut, while at the same time fastening it retractively. In this way, the amount can be changed by which the forward end of the axial portion of the closed-up opening degree adjustment screw is projected from the end of the sleeve nut toward a block-shaped, boss-shaped or protruded closed-up stopper (contact portion) formed on the outer periphery of the rotational drive member. As a result, the throttle valve opening degree can be adjusted to the closed-up set opening degree for the throttle valve in closed-up state.

The present invention may be more fully understood from the description of preferred embodiments of the invention, as set forth below, together with the accompanying drawings.

DESCRIPTION OF THE PREFERRED EMBODIMENTS

In the best mode for carrying out the invention, the stress (internal distortion) otherwise caused by the tapping around or in the neighborhood of the female screw hole is prevented in such a manner that a sleeve nut having a female screw hole along the internal axis thereof is fixedly held between the opening-side end surface of a housing and the coupling end surface of a housing cover, and a throttle opening degree adjustment screw is screwed retractively in the female screw hole of the sleeve nut.

First Embodiment

Figure 1:
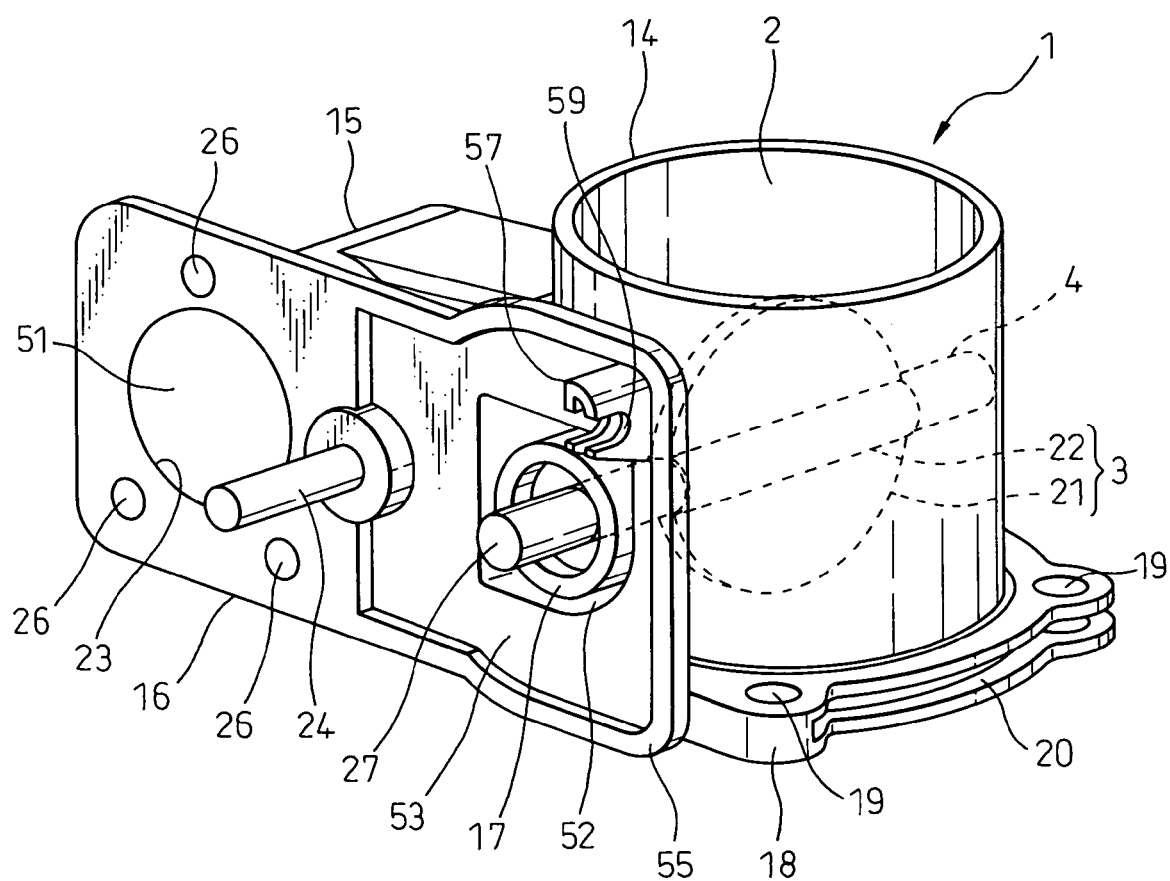
FIG. 1 is a perspective view showing a main structure of an electronically controlled throttle valve control unit according to a first embodiment of the invention.

A first embodiment of the invention is shown in FIGS. 1 to 4. FIG. 1 shows a main structure of an electronically controlled throttle valve control unit, FIG. 2 an overall structure of the electronically controlled throttle valve control unit, and FIG. 3 a general structure of the electronically controlled throttle valve control unit.

In the electronically controlled throttle valve control unit according to this embodiment, the amount of the intake air flowing into the combustion chamber of each cylinder of the internal combustion engine (hereinafter sometimes referred to simply as the engine) such as a gasoline engine is controlled based on the degree to which the acceleration pedal (not shown) of the automotive vehicle is stepped on (hereinafter referred to as the acceleration pedal angle) thereby to control the engine torque or the engine speed.

The electronically controlled throttle valve control unit is an intake air control apparatus for the internal combustion engine including a throttle body 1 mounted at the bracket end surface (end surface of the mounting flange) supported on the surge tank or the intake manifold of the engine, a throttle valve 3 accommodated openably in a throttle bore 2 having a circular cross section of the throttle body 1, a throttle shaft 4 rotated integrally with the throttle valve 3, a drive motor (actuator, not shown) for driving the throttle valve in the full-open direction or the closed-up direction, a valve gear (rotary drive member) 5 making up one of the component elements of a mechanical reduction gear (power transmission gear) for transmitting the turning effort of the drive motor to the throttle valve 3, and an engine control unit (ECU) for driving the drive motor in accordance with the acceleration pedal angle set by the driver and thus electronically controlling the throttle valve opening degree corresponding to the rotational angle of the throttle valve 3.

Also, the electronically controlled throttle valve control unit comprises a single coil spring 6 including, integrated with each other, a first spring (hereinafter referred to as a return spring) 11 having the function as a return spring and a second spring (hereinafter referred to as a default spring) 12 having the function as an opener spring thereby to urge the throttle valve 3 in the closed-up direction and the full open direction, and an intermediate opening degree adjustment mechanism for manually adjusting the intermediate set opening degree (default opening degree) of the throttle valve 3 within an appropriate range.

According to this embodiment, the throttle body 1 is a thermoplastic resin product formed by injection molding of a thermoplastic resin material (heat-resistant resin such as polyphenylene sulfide (PPS), polyamide (PA), polypropylene (PP) or polyether imide (PEI)) into a predetermined shape in an injection molding die. The throttle body 1 has a cylindrical throttle bore portion (cylindrical portion, hereinafter referred to as a bore wall) 14 forming a throttle bore (intake air path) 2. The throttle body 1 is a throttle housing forming an intake air path having a substantially circular cross section through which the intake air flows toward the engine in the bore wall 14, and is a device which holds the throttle valve 3 in the throttle bore 2 rotatably from the closed-up position to the full open position. This device is fixedly fastened, using fastening means (not shown) such as fixing bolts and fastening screws, on the bracket end surface supported on the surge tank or the intake manifold of the engine.

The bore wall 14 includes an air inlet (intake air path) for introducing the intake air through an intake pipe (not shown) from an air cleaner (not shown) and an air outlet (intake air path) for allowing the intake air to flow into the intake manifold or the surge tank of the engine. The air inlet and the air outlet are formed integrally in such a manner to maintain substantially the same inner diameter and the same outer diameter over the direction of the intake air flow. Also, the outer wall of the bore wall 14 is formed integrally, by resin molding, with a motor housing 15 for accommodating and holding a drive motor and a gear housing 16 for rotatably accommodating a coil spring 6 and the gears making up the mechanical reduction gear.

On both sides of the cross section of the bore wall 14 in the direction substantially perpendicular to the center axis thereof, a substantially cylindrical first bearing boss (first bearing support) for rotatably supporting one axial end (first bearing slide portion) of the throttle shaft 4 and a substantially cylindrical second bearing boss (second bearing support) for rotatably supporting the other axial end (second bearing sliding portion) of the throttle shaft 4 are formed integrally. Inside the first and second bearing bosses, first and second bearings (not shown) for slidably journaling the first and second bearing sliding portions of the throttle shaft 4 in the direction of rotation are inserted. The first bearing boss is formed integrally in such a manner as to be projected rightward in the drawing from the outer wall surface of the bore wall 14, i.e. the bottom wall surface of the gear housing 16. The outer peripheral portion of the first bearing boss functions as a spring inner peripheral guide 17 to hold the inner diametrical side of the return spring 11 of the coil spring 6.

On the outer periphery of the downstream end along the axis of the bore wall 14, a mounting flange 18 coupled, using a fastening means (not shown) such as a fastening bolt, to the bracket end surface supported by the intake manifold or the surge tank of the engine is formed integrally by resin molding. The mounting flange 18 is projected radially outward from the outer wall surface of the lower end shown of the bore wall 14, and formed with a plurality of round insertion holes 19 through which to insert the fastening means such as fastening bolts. Further, the outer peripheral surface of the mounting flange 18 is formed with an undercut groove 20 communicating with a part of the insertion holes 19.

The ECU is connected with an accelerator opening degree sensor (not shown) for converting the acceleration pedal angle set by the driver into an electrical signal (accelerator opening degree signal) and outputting to the ECU the degree to which the acceleration pedal is moved. Also, the throttle control unit for the internal combustion engine includes a rotational angle sensor (throttle position sensor) for converting the opening degree of the throttle valve 3 into an electrical signal (throttle opening degree signal) and outputting to the ECU the degree to which the throttle valve 3 is open. The ECU according to this embodiment controls the drive motor by proportional-plus-integral-plus-derivative (PID) feedback in such a manner as to eliminate the difference between the throttle opening degree signal from the rotational angle sensor and the accelerator opening degree signal from the accelerator opening degree sensor.

The rotational angle sensor is a throttle opening degree sensor to detect the throttle opening degree corresponding to the rotational angle of the throttle valve 3, and is configured of a split-type (substantially square) permanent magnet providing a magnetic field source mounted at one axial end of the throttle shaft 4 rotated integrally with the throttle valve 3, and a non-contact magnetism sensor (such as a Hall element, a Hall IC or a magnetoresistive element) arranged in opposed relation to the inner peripheral surface of a split-type (substantially arcuate) yoke magnetized by the magnet for detecting the rotational angle (valve angle) of the throttle valve 3 in response to the magnetic force of the magnet. The rotational angle sensor, or especially, the non-contact magnetism sensor is arranged integrally with a sensor cover 8 assembled on the outer wall of the throttle body 1. Also, the magnet and the yoke are fixed using an adhesive or the like on the inner peripheral surface of the valve gear 5 providing one of the component elements of the mechanical reduction gear.

The throttle valve 3 is a thermoplastic resin product formed by injection molding of a thermoplastic resin material (heat-resistant resin such as polyphenylene sulfide (PPS), polyamide (PA), polypropylene (PP) or polyether imide (PEI)) substantially into the shape of a disk in an injection molding die. According to this embodiment, the throttle valve 3 is a butterfly-type rotary valve (resin valve) having the center axis of rotation substantially perpendicular to the average flow axis of the intake air flowing in the throttle bore 2 of the throttle body 1, in which the amount of the intake air introduced into the engine is controlled by changing the rotational angle (valve opening degree) within the rotatable range from the closed-up position minimizing the intake air amount and the full open position maximizing the intake air amount. The throttle valve 3 includes a substantially round resin disk (disk portion) 21 and a substantially cylindrical resin shaft (cylinder portion) 22 and is formed integrally by resin molding on the outer periphery of the valve holder of the throttle shaft 4. As a result, the throttle valve 3 and the throttle shaft 4 are integrated and are rotated integrally with each other.

The throttle shaft 4 is formed as an axial round rod of a metal material such as brass or stainless steel and makes up a metal shaft of the throttle valve 3. The throttle shaft 4 includes a valve holder for fixedly holding the throttle valve 3 to reinforce the throttle valve 3 of resin while at the same time being insertion molded in the cylindrical portion 22 of the throttle valve 3. Also, a first axial end of the throttle shaft 4 is exposed (projected) from a first end surface of the cylindrical portion 22 of the throttle valve 3 and functions as a first bearing sliding portion adapted to slide rotatably in the first bearing boss of the throttle body 1. The second axial end of the throttle shaft 4, on the other hand, is exposed (projected) from the second end surface of the cylindrical portion 22 of the throttle valve 3 and functions as a second bearing sliding portion adapted to slide rotatably in the second bearing boss of the throttle body 1. The first axial end of the throttle shaft 4 is formed integrally with a valve gear 5 making up one of the component elements of the mechanical reduction gear.

The power unit for rotationally driving the throttle valve 3 and the throttle shaft 4 in the valve-opening direction (or the valve-closing direction) includes a drive motor providing a power source and a mechanical reduction gear for reducing the rotational speed of the drive motor to a predetermined reduction ratio. According to this embodiment, the mechanical reduction gear includes a pinion (not shown) fixed on the outer periphery of the motor shaft of the drive motor, an intermediate reduction gear (not shown) rotated in mesh with the pinion and a valve gear 5 rotated in mesh with the intermediate reduction gear. The mechanical reduction gear is thus used as a power transmission gear to transmit the turning effort of the drive motor to the throttle shaft 4.

The drive motor according to this embodiment is an electrically-operated actuator (drive source) integrally connected to the motor conduction terminal embedded in the sensor cover 8 and has a motor shaft (not shown) rotated in the forward or the backward direction. The front end frame of the drive motor is fixedly fastened around a circular motor insertion hole 23 formed in the bottom wall of the gear housing 16. The intermediate reduction gear of the mechanical reduction gear is fitted rotatably on the outer periphery of the support shaft 24 constituting the center of rotation. A first axial end of the support shaft 24 is fitted in the recess formed in the inner wall surface of the sensor cover 8, and the second end thereof is fitted under pressure in the recess formed in the outer wall surface of the bore wall 14 of the throttle body 1. Numeral 26 designates a plurality of threaded holes into which fastening means (not shown) such as fastening screws are screwed to fixedly fasten the front end frame of the drive motor on the bottom wall of the housing 16.

The valve gear 5 according to this embodiment is a substantially annular thermoplastic resin product (rotary drive member) formed by injection molding of a thermoplastic resin material (heat-resistant resin such as polyphenylene sulfide (PPS), polyamid (PA), polypropylene (PP) or polyether imide (PEI)) into a predetermined shape in an injection molding die. The outer peripheral surface of the valve gear 5 is formed integrally with a gear (toothed portion) 31 in mesh with the intermediate reduction gear. The outer peripheral portion of the valve gear 5, i.e. one peripheral end surface of the gear 31 is formed integrally with a closed-up stopper portion 32 adapted to engage a closed-up position stopper (not shown) formed as a block (or a boss or a protrusion) integrally on the gear housing 16 of the throttle body 1 when the throttle valve 3 is closed up.

The outer peripheral portion of the valve gear 5, i.e. the other peripheral end surface of the gear 31, on the other hand, is formed integrally with a full-open stopper portion 33 adapted to engage a block-shaped (or boss-shaped or protruded) full-open position stopper (not shown) integrally formed on the gear housing 16 of the throttle body 1 when the throttle valve 3 is opened to the full-open position. The inner peripheral portion of the valve gear 5 has a fitting hole adapted to fit the fitting portion 27 formed at one axial end of the throttle shaft 4. According to this embodiment, a two-surface width portion are formed on the outer periphery of the fitting portion 27 of the throttle shaft 4 and the inner periphery of the fitting hole of the valve gear 5, respectively, in order to define the throttle valve 3, the throttle shaft 4 and the valve gear 5 at predetermined relative angles to each other on the one hand and to prevent the throttle shaft 4 and the valve gear 5 from rotating relatively to each other on the other hand. The valve gear 5 is fixed at one axial end (fitting portion 27) of the throttle shaft 4 protruded from the fitting hole by caulking the fitting portion 27.

From the outer peripheral portion of the valve gear 5, i.e. the outer peripheral portion at some distance peripherally from the closed-up stopper portion 32, an opener member (opener lever) 34 is formed integrally and is projected substantially in the shape of L axially leftward in the drawing (toward the body or the throttle bore). The opener member 34 is rotated integrally with the throttle valve 3 and the throttle shaft 4 and urged toward the intermediate position (in the full-open direction) from the closed-up position by the default spring 12 of the coil spring 6. The opener lever 34 is formed integrally with a second engaging portion 35 to engage the second end of the default spring 12 of the coil spring 6, a hook engaging portion 36 adapted to removably engage the U-shaped hook 13 providing a coupling between the return spring 11 and the default spring 12 of the coil spring 6, and a plurality of anti-horizontal displacement guides 37 in the neighborhood of the hook engaging portion 36 for restricting the further movement of the U-shaped hook 13 of the coil spring 6 in the axial direction (horizontal direction in the drawing).

The outer periphery of the cylindrical portion, formed integrally in such a manner as to project leftward in the drawing from the body side (side surface of the throttle bore) of the valve gear 5, functions as a spring inner peripheral guide 39 to hold the inner diametrical side of the default spring 12 of the coil spring 6. This spring inner peripheral guide 39 is arranged in opposed relation to the spring inner peripheral guide 17 holding the diametrically inner side of the return spring 11 of the coil spring 6, on substantially the same axis and in such a manner as to have substantially the same outer diameter as the spring inner peripheral guide 17. The spring inner peripheral guide 39 thus holds the diametrically inner side of the coil spring 6 from the return spring 11 in the neighborhood of the U-shaped hook 13 of the coil spring 6 to the neighborhood of the second end of the default spring 12.

The coil spring 6 according to this embodiment is a single coil-shaped spring including, integrated with each other, the return spring 11 for urging the throttle valve 3 back from the full-open position to the intermediate position (default opening degree) and the closed-up position through the opener lever 34 integrated with the valve gear 5, and the default spring 12 for urging the throttle valve 3 back from the closed-up position to the intermediate position (default opening degree) through the opener lever 34 integrated with the valve gear 5. The coil spring 6 thus urges the throttle valve 3 in the direction toward the closed-up position and the direction toward the full-open position. The coil spring 6 is mounted between the outer wall surface of the bore wall 14 of the throttle body 1, i.e. the cylindrically recessed bottom wall surface of the gear housing 16 and the end surface of the valve gear 5 nearer to the bore wall, in which the coupling (intermediate portion) between the return spring 11 and the default spring 12 is bent in the shape of an inverse-U into a U-shaped hook 13 held on the intermediate opening degree adjustment screw 7. The coil spring 6 thus constitutes a single coil-shaped spring structure with the two ends thereof wound in different directions.

The single coil spring 6 according to this embodiment is a single coil-shaped spring mounted between the outer wall surface of the bore wall 14 of the throttle body 1 and the opposed surface of the valve gear 5. The spring coil 6 includes the return spring 11 and the default spring 12 integrated with each other, in which a first end of the return spring 11 and a second end of the default spring 12 are wound in different directions. The coupling between the return spring 11 and the default spring 12 has the U-shaped hook 13 held on the intermediate opening degree adjustment screw 7 in case power to the drive motor is stopped by some reason. The return spring 11 is formed of a round rod of spring steel in a coil. The first end of the return spring 11 is formed with a spring body-side hook (first engaged portion) 41 engaged or held by a first engaging portion 25 formed integrally on the outer wall surface of the bore wall 14 of the throttle body 1.

The default spring 12 is formed of a round rod of spring steel in coil. The default spring 12 is wound in the opposite direction (coiling direction) to the return spring 11. In addition, the number of turns of the default spring 12 (the height along the center axis thereof) is smaller than the number of turns of the return spring 11 (the height along the center axis thereof). The default spring 12, together with the return spring 11, makes up a coil having substantially the same outer coil diameter and substantially the same coil intervals, i.e. substantially the same coil pitches, along the center axis. Further, the wire diameter of the default spring 12 is substantially equal to the wire diameter of the return spring 11. Also, the outer diameter of the coil of the default spring 12 is substantially equal to the outer diameter of the coil of the return spring 11. Furthermore, the second end of the default spring 12 is formed with a spring gear-side hook (second engaged portion) 42 engaged or held by a second engaging portion 35 of the opener lever 34.

The single coil spring 6, i.e. the return spring (first spring) 11 or the default spring (second spring) 12, or especially, the default spring (second spring) 12 may constitute an equal-pitch coil having substantially the same outer diameter along the center axis and equal coil intervals, an unequal-pitch coil having substantially the same outer diameter along the center axis and unequal coil intervals, or a nonlinear spring (such as a hourglass-shaped spring, a barrel-shaped spring or a truncated cone-shaped spring) having the coil outer diameters changing along the center axis.

In the electronically controlled throttle valve control unit according to this embodiment, as described above, the outer wall portion of the bore wall 14 of the throttle body 1 is formed, integrally by resin molding, with a motor housing 15 for accommodating and holding the drive motor and a gear housing 16 for accommodating the coil spring and for rotatably accommodating the gears making up the mechanical reduction gear. The opening side of the gear housing 16 is sealed in air tight fashion or liquid tight fashion by a sensor cover 8 holding the magnetism sensor, the terminal and the stator of a rotational angle sensor. A motor accommodating hole (internal space) 51 having a circular cross section to fixedly hold the drive motor is formed in the motor housing 15. Also, a spring chamber (internal space) 52 having a cylindrical cross section for accommodating the coil spring 6 and a gear chamber (internal space) 53 for rotatably accommodating the gears making up the mechanical reduction gear are formed in the gear housing 16. The bottom wall of the gear housing 16 is formed integrally with a substantially circular motor insertion hole 23 through which the drive motor in inserted into the motor accommodating hole 51. Also, the gear housing 16 is formed integrally with a first engaging portion (body-side hook) 25 adapted to engage the first end of the return spring 11 of the coil spring 6.

The sensor cover 8 is a thermoplastic resin product (housing cover), formed by injection molding into a predetermined shape in an injection molding die, of a thermoplastic resin material (heat-resistant resin such as polyphenylene sulfide (PPS), polyamid (PA), polypropylene (PP) or polyether imide (PEI)) capable of electrically insulating the terminals of the rotational angle sensor and the power terminals of the drive motor. The sensor cover 8 is formed integrally, by resin molding, with a cylindrical connector receiver 54 connected with a connector not shown. The motor accommodating hole 51 is formed between the sensor cover 8 and the motor housing 15, and the spring chamber 52 and the gear chamber 53 are formed between the sensor cover 8 and the recessed portion of the gear housing 16.

Figure 2:
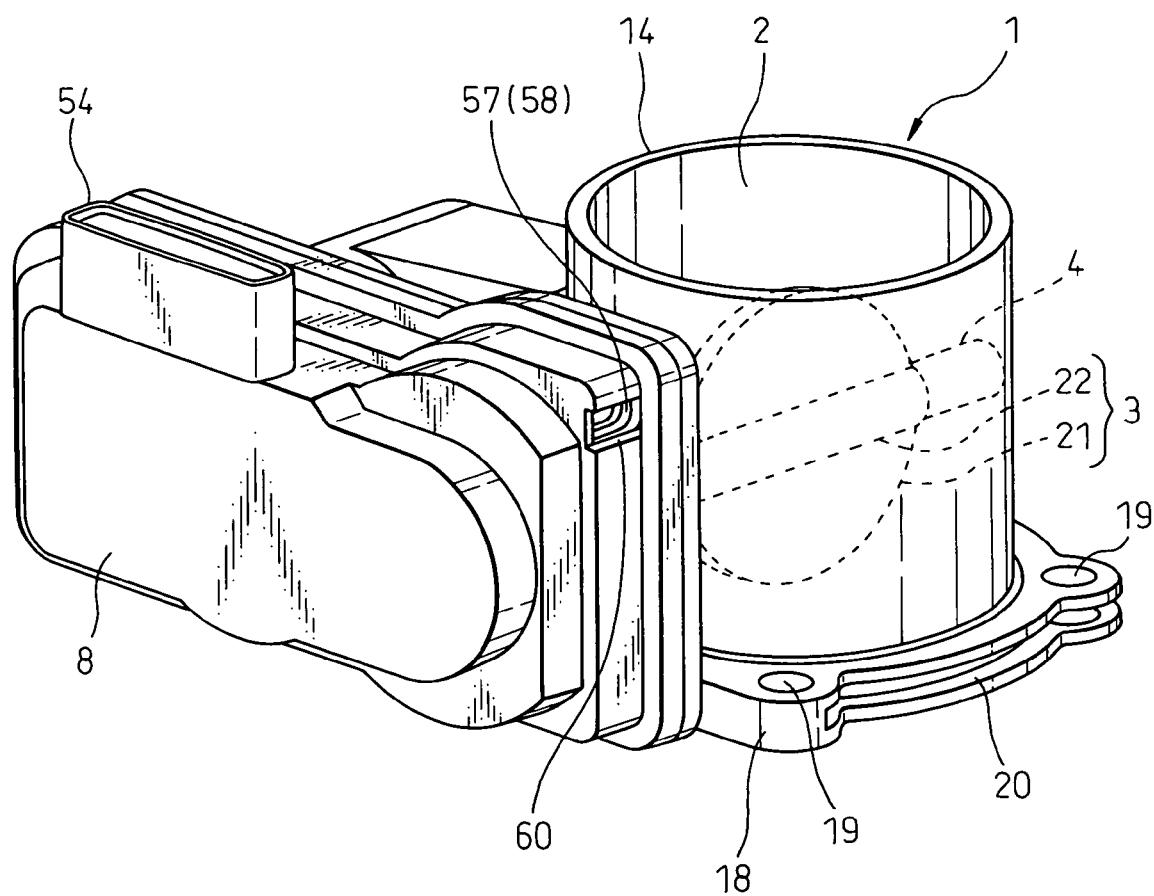
FIG. 2 is a perspective view showing an overall structure of an electronically controlled throttle valve control unit according to the first embodiment of the invention.
Figure 3:
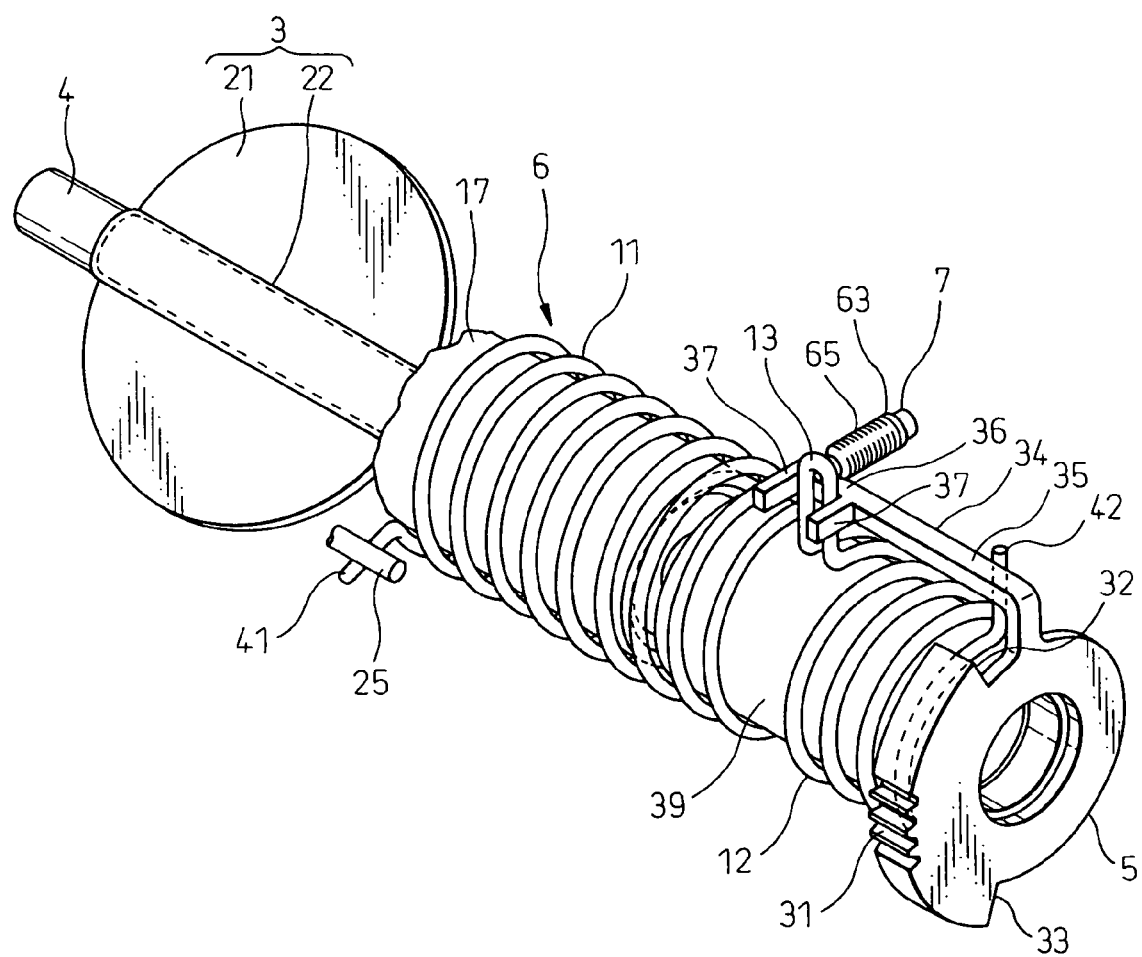
FIG. 3 is a perspective view showing a general configuration of an electronically controlled throttle valve control unit according to the first embodiment of the invention.
Figure 4:
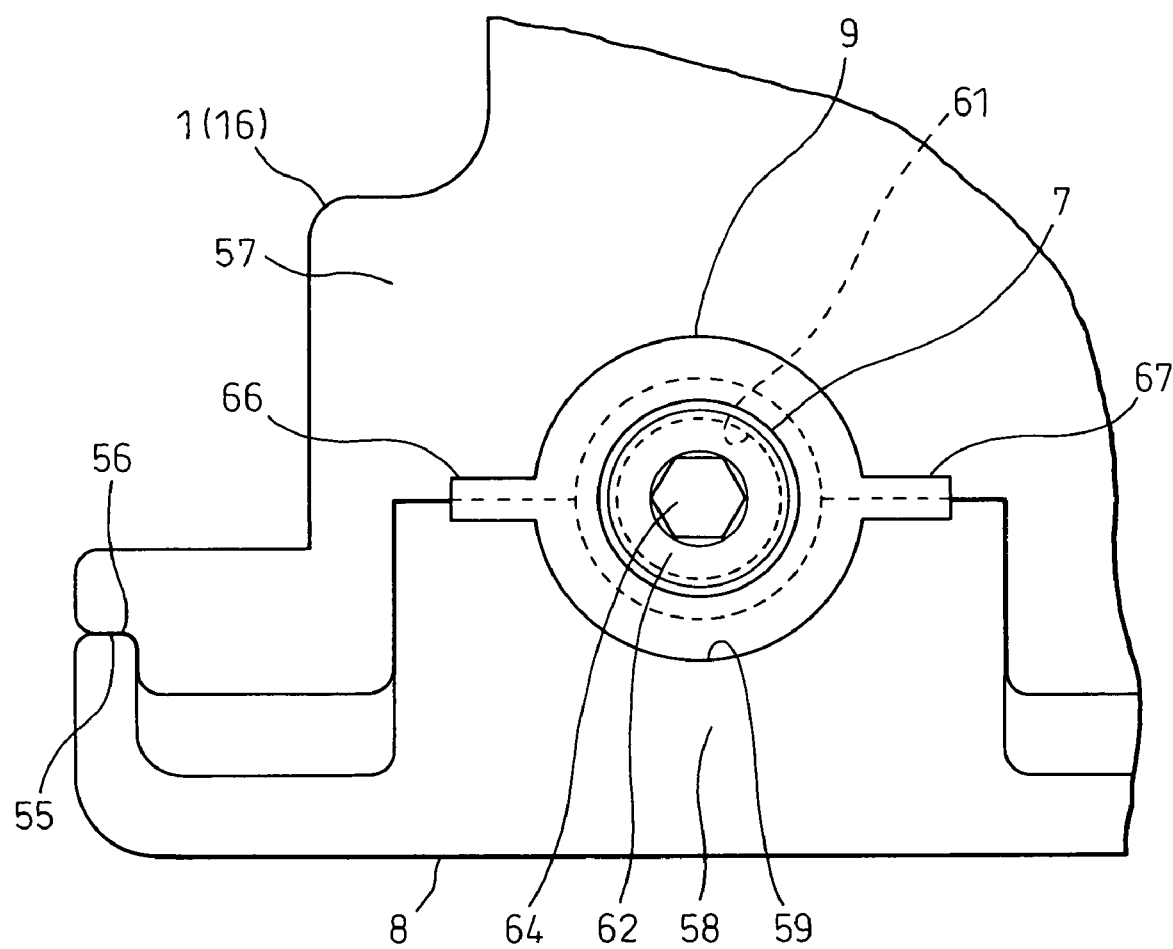
FIG. 4 is a plan view showing the coupling between a gear housing of a throttle body and a sensor cover according to the first embodiment of the invention.

The sensor cover 8, as shown in FIGS. 1, 2 and 4, has a rectangular annular coupling end surface 56 coupled to the rectangular annular opening-side end surface 55 formed on the opening side of the gear housing 16, and is assembled on the opening side end surface 55 of the gear housing 16 by a rivet, a screw or thermal caulking. According to this embodiment, the sensor cover 8 and the gear housing 16 of the throttle body 1 are formed integrally with fitting bosses 57, 58 to fit and hold the sleeve nut 9 for fixedly holding the intermediate opening degree adjustment screw 7 when the coupling end surface 56 of the sensor cover 8 is assembled on the opening-side end surface 55 of the gear housing 16. Also, the side wall of the sensor cover 8 is formed with an intermediate opening degree adjustment work opening (window) 60 communicating with the fitting hole 59 formed between the fitting bosses 57, 58. The fitting boss 58 has a protrusion toward the gear housing 16, and the fitting boss 57 has a protrusion toward the sensor cover 8 in such a manner as to cover the protrusion of the fitting boss 58 from both sides. The protrusions of the fitting bosses 57, 58 are fitted to hold the sleeve nut 9 in the fitting hole 59 formed between the fitting bosses 57, 58.

The intermediate opening degree adjustment mechanism according to this embodiment is configured of an intermediate opening degree adjustment screw 7 and a sleeve nut 9 having an internal axial female screw hole 61. In the case where electric current to the drive motor is stopped for some reason (the drive motor powered off) or with the engine stopped (the drive motor powered off), then the throttle valve 3 is held or engaged mechanically at a predetermined intermediate position (intermediate set opening degree or default opening degree) between the closed-up position and the full-open position by the intermediate opening degree adjustment screw 7 using the urging forces of the return spring 11 and the default spring 12 of the coil spring 6 in different directions.

The intermediate opening degree adjustment screw 7 is integrally formed of a metal material in the shape of an rod, and has a solid-cylindrical screw head 62 and a threaded portion (axial portion) 63 extended axially from the screw head 62 toward the U-shaped hook 13 of the coil spring 6. The screw head 62 is formed with a hexagonal engaging recess 64 adapted to engage the fastening tool (such as a hexagon wrench) inserted into the female screw hole 61 of the sleeve nut 9 from outside the sensor cover 8. The part of the threaded axial portion 63 nearer to the screw head 62 is formed with a cylindrical portion (solid-cylindrical portion). Also, the outer periphery of the forward end of the threaded axial portion 63 is formed with a male screw 65 adapted to be screwed into the female screw hole 61 of the sleeve nut 9. The intermediate opening degree adjustment screw 7 constitutes a throttle valve opening degree adjustment screw which has the male screw 65 adapted to be retractively screwed in the female screw hole 61 of the sleeve nut 9, so that when the throttle valve 3 is located within a set opening degree range between the closed-up position and the intermediate position, the screw 7 comes into direct contact with the U-shaped hook 13 of the coil spring 6. In this way, the rotational operation of the throttle valve 3 is restricted at the intermediate set opening degree (throttle opening degree).

The sleeve nut 9 is integrally formed of a metal material into a predetermined shape. In the set opening degree range from the closed-up position to the intermediate position of the throttle valve 3, the sleeve nut 9 is fixedly held between the fitting boss 57 of the gear housing 16 and the fitting boss 58 of the sensor cover 8 in opposed relation to the U-shaped hook 13 of the coil spring 6. The female screw hole 61 of the sleeve nut 9 is arranged to establish communication between the interior and the exterior of the gear chamber 53 through the intermediate opening degree adjustment work opening 60 of the sensor cover 8. The flat fitting pieces 66, 67 to increase the contact area with the fitting hole 59 formed between the fitting bosses 57, 58 are projected toward the radial ends (a direction along the coupling surface between the opening side end surface 55 and the coupling end surface 56) on the outer periphery of the sleeve nut 9. The fitting hole 59 formed between the fitting bosses 57, 58 assumes a shape corresponding to the fitting pieces 66, 67 and the outer diameter of the sleeve nut 9.

Intermediate Opening Degree Adjustment Method According to First Embodiment

Next, the intermediate opening degree adjustment method for the electronically controlled throttle valve control unit according to this embodiment is explained with reference to FIGS. 1 to 4.

First, the throttle valve 3 and the throttle shaft 4 are rotatably built into the throttle bore 2 of the throttle body 1. As an alternative, the throttle body 1 and the throttle valve 3 are formed by injection molding at the same time in the same injection molding die, and the throttle shaft 4 is insertion molded in the cylindrical portion 2 of the throttle valve 3. Then, the coil spring 6 is built in the spring chamber 52 of the gear housing 16 of the throttle body 1, and the spring body-side hook (first engaged portion) 41 of the return spring 11 of the coil spring 6 is engaged with the first engaging portion (body-side hook) 25, while the spring gear-side hook (second engaged portion) 42 of the default spring 12 is engaged with the second engaging portion (gear-side hook) 35 of the opener lever 34 of the valve gear 5. The fitting hole of the valve gear 5 is fitted at a first axial end (fitting portion 27) of the throttle shaft 4, after which the fitting portion 27 projected from the valve gear 5 is caulked. In this way, the valve gear 5 is fixedly caulked at the first axial end (fitting portion) 27 of the throttle shaft 4.

Next, the sleeve nut 9 is fitted on the fitting boss 57 formed in the neighborhood of the opening-side end surface 55 of the gear housing 16 of the throttle body 1 or the fitting boss 58 formed in the neighborhood of the coupling end surface 56 of the sensor cover 8. The coupling end surface 56 of the sensor cover 8 is fitted on the opening-side end surface 55 of the gear housing 16, after which the gear housing 16 of the throttle body 1 and the sensor cover 8 are assembled one on the other by riveting, screwing or thermal caulking. As a result, the sleeve nut 9 is fixedly held between the coupling bosses 57, 58 simply by assembling the sensor cover 8 on the throttle body 1.

The intermediate opening degree adjustment screw 7 is inserted into the gear chamber 53 and the spring chamber 52 of the gear housing 16 from the intermediate opening degree adjustment work opening (window) 60, the male screw 65 of the intermediate opening degree adjustment screw 7 is screwed into the female screw hole 61 of the sleeve nut 9, and the intermediate opening degree adjustment screw 7 is fastened into the sleeve nut 9 using a fastening tool. The forward end of the male screw 65 of the intermediate opening adjustment screw 7 is projected toward the U-shaped hook 13 of the coil spring 6 from the U-shaped hook end surface of the sleeve nut 9.

Figure 8:
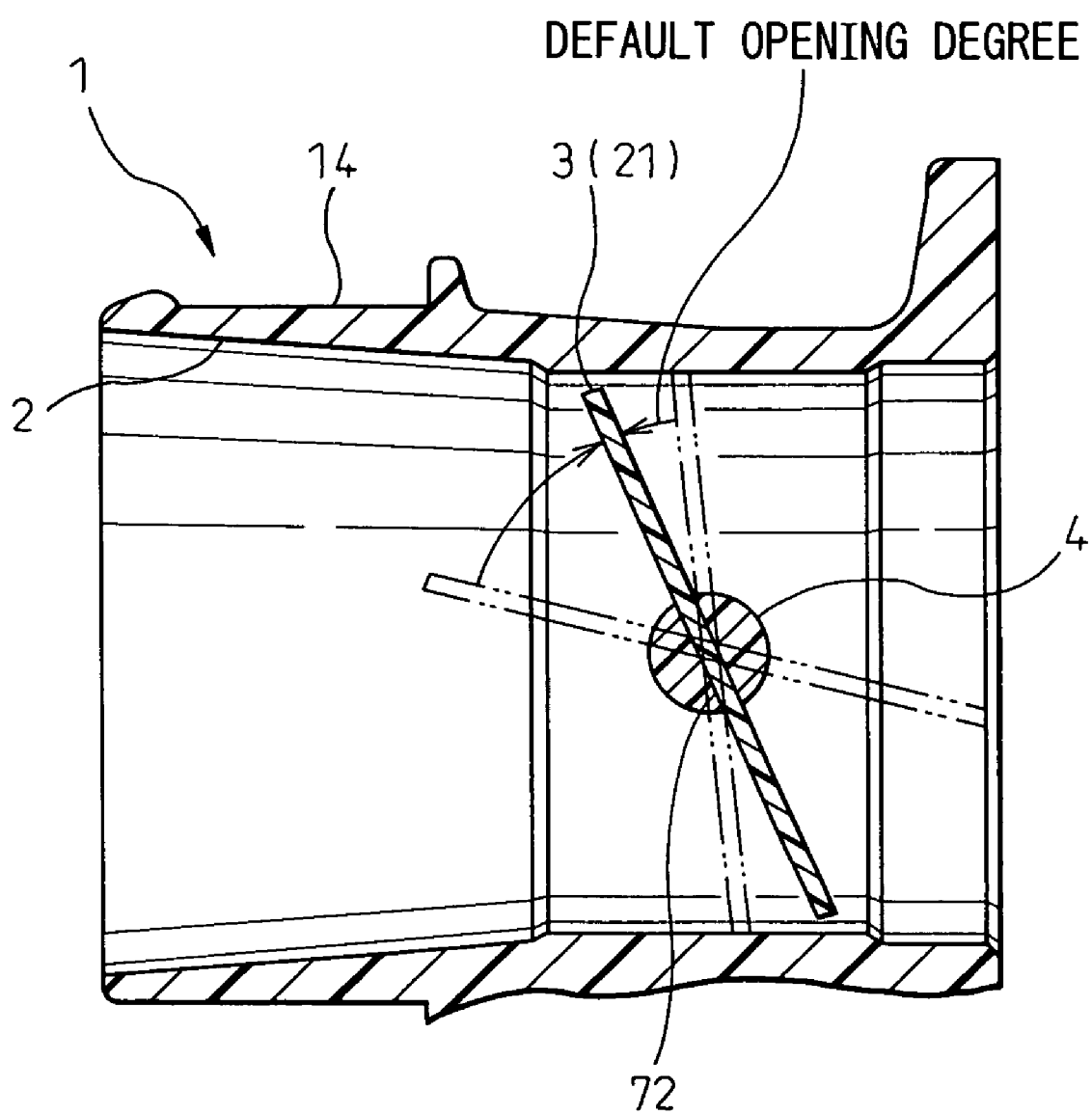
FIG. 8 is a sectional view of the throttle valve at the closed-up position, the intermediate position (default opening degree) and the full-open position according to the fourth embodiment of the invention.
Figure 9:
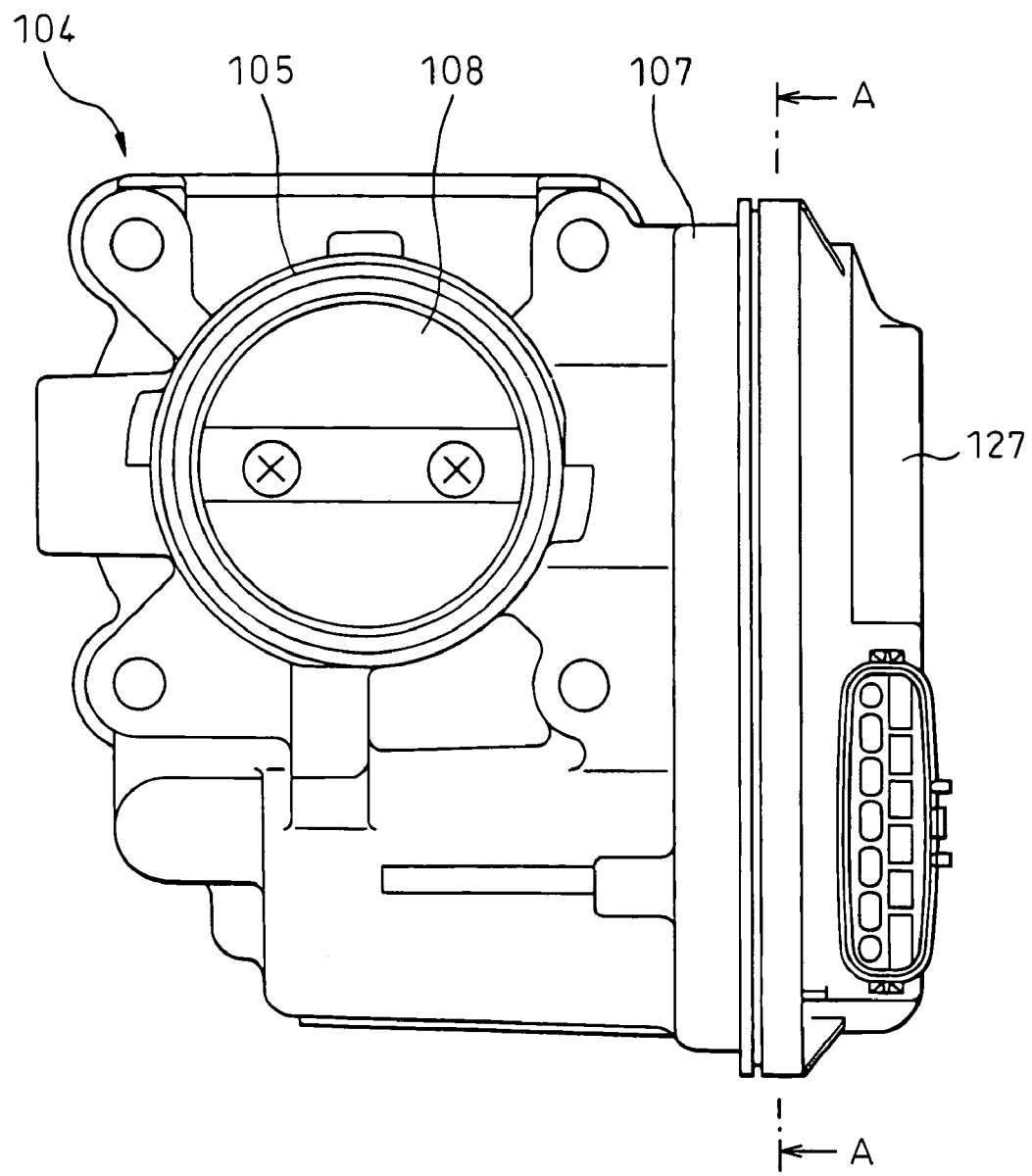
FIG. 9 is a front view showing an overall structure of the conventional electronically controlled throttle valve control unit.
Figure 10:
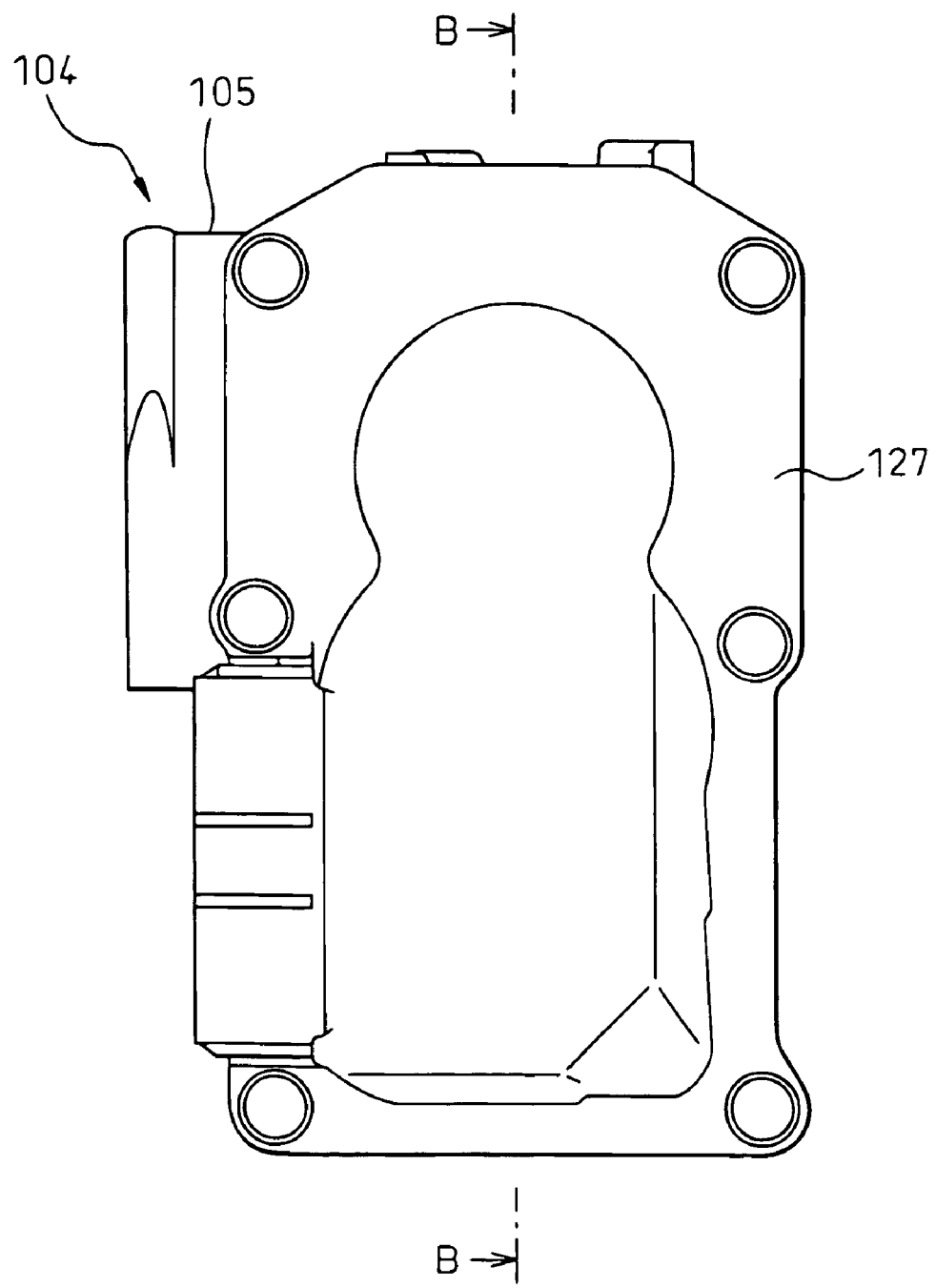
FIG. 10 is a side view showing an overall structure of the conventional electronically controlled throttle valve control unit.

This process is continued until the forward end of the male screw 65 of the intermediate opening degree adjustment screw 7 comes into direct contact with the U-shaped hook 13 of the coil spring 6 and the throttle valve 3 opens almost to the intermediate position from the closed-up position in the throttle bore 2. In this way, the male screw 65 of the intermediate opening degree adjustment screw 7 is screwed retractively into the female screw hole 61 of the sleeve nut 9 in such a manner that the intermediate opening degree adjustment screw 7 is protruded to an extent within an appropriate range. Thus, the throttle opening degree corresponding to the rotational angle of the throttle valve 3 is adjusted to the intermediate position (intermediate set opening degree or default opening degree) set when the electric current to the drive motor is cut off for some reason (the drive motor powered off) or when the electric current to the drive motor is stopped with the engine stopped (drive motor powered off) (FIG. 8). After adjustment, an adhesive is applied to the intermediate opening degree adjustment screw 7, so that the intermediate opening degree adjustment screw 7 is fixed while at the same time securing airtightness in the gear chamber 53 and preventing the play of the intermediate opening degree adjustment screw 7.

Next, the operation of the electronically controlled throttle valve control unit according to the first embodiment of the invention is explained with reference to FIGS. 1 to 4.

The normal operation of the electronically controlled throttle valve control unit with the throttle valve 3 opened from the intermediate position is explained. Upon depression of the acceleration pedal by the driver, the acceleration pedal angle sensor applies an acceleration pedal angle signal to the ECU. The drive motor is started and the motor shaft (output shaft) of the drive motor is rotated to attain a predetermined opening degree of the throttle valve 3 under the control of the ECU. The output shaft torque of the drive motor is transmitted to the gears of the mechanical reduction gear. At the same time, the hook engaging portion 36 of the opener lever 34 presses the U-shaped hook 13 of the coil spring 6 against the urging force of the return spring 11 having the return spring function.

With the rotation of the valve gear 5 in the opening direction, the return spring 11 at which the spring body-side hook 41 engages the body-side hook 25 of the throttle body 1 develops an urging force in such a direction as to urge the throttle valve 3 to return from the full-open position to the intermediate position through the opener lever 34. As a result, the valve gear 5 rotates, and the throttle shaft 4 rotates a predetermined rotational angle corresponding to the acceleration pedal angle set by the driver, so that the throttle valve 3 rotates in the direction (opening direction) to open from the intermediate position to the full-open position. The urging force of the default spring 12 does not participate in this rotation of the throttle valve 3 in the opening direction, thereby keeping the opener lever 34 held between the coupling side end of the default spring 12 and the spring gear-side hook 42.

The normal operation of the electronically controlled throttle valve control unit to close the throttle valve 3 from the intermediate position is explained. When the accelerator pedal is released, the drive motor shaft rotates in reverse direction, and so do the throttle valve 3, the throttle shaft 4 and the valve gear 5. In the process, the gear side hook 35 of the opener lever 34 presses the spring gear-side hook 42 of the default spring 12 against the urging force of the default spring 12.

With the rotation of the valve gear 5 in the closing direction, the default spring 12 exerts an urging force on spring gear-side hook 42 in mesh with the gear-side hook 35 of the opener lever 34 to return the throttle valve 3 from the closed-up position to the intermediate position through the opener lever 34. The throttle shaft 4 rotates a predetermined angle and the throttle valve 3 rotates in such a direction as to close from the intermediate position to the closed-up position (i.e. in the closing direction reverse to the opening direction of the throttle valve 3). The closed-up stopper portion 32 formed integrally on the outer periphery of the valve gear 5 comes into contact with the closed-up stopper, and therefore the throttle valve 3 is held in the closed-up position. The urging force of the return spring 11 does not participate in the rotation of the throttle valve 3 in the closing direction. The electric current flows in the drive motor in opposite directions with respect to the intermediate position.

The operation of the electronically controlled throttle valve control unit with the electric current stopped to the drive motor for some reason is explained below. While the opener lever 34 is held between the coupling side end portion of the default spring 12 and the spring gear-side hook 42, the return spring 11 functions to return the throttle valve 3 from the full-open position to the intermediate position through the opener lever 34, and the default spring 12 functions as an opener spring to return the throttle valve 3 from the closed-up position to the intermediate position through the opener lever 34. As a result, the hook engaging portion 36 of the opener lever 34 comes into contact with the U-shaped hook 13 of the coil spring 6 engaged at the forward end of the male screw 65 of the intermediate opening degree adjustment screw 7. Thus, the throttle valve 3 is held positively at the intermediate position, and therefore the movement of the vehicle to the refuge becomes possible in case electric current to the drive motor is stopped for some reason.

As described above, in the electronically controlled throttle valve control unit according to this embodiment, the throttle body 1, the throttle valve 3 and the sensor cover 8 are formed of resin to thereby reduce the fuel consumption, weight and cost. Also, the sleeve nut 9 can be fixedly held between the fitting boss 57 of the gear housing 16 of the throttle body 1 and the fitting boss 58 of the sensor cover 8 simply by fitting the sleeve nut 9 in the fitting boss 57 formed in the neighborhood of the opening-side end surface 55 of the gear housing 16 of the throttle body 1 or the fitting boss 58 formed in the neighborhood of the coupling end surface 56 of the sensor cover 8, and then assembling the coupling end surface 56 of the sensor cover 8 on the opening-side end surface 55 of the gear housing 16.

Specifically, without using the tapping method in which the intermediate opening degree adjustment screw 7 is forced directly into the gear housing 16 of the resin throttle body 1, the male screw 65 of the intermediate opening degree adjustment screw 7 is screwed retractively in the female screw hole 61 of the sleeve nut 9 fixedly held between the fitting bosses 57, 58. In this way, the intermediate opening degree adjustment screw 7 can be held on the gear housing 16 of the throttle body 1 formed of resin. In screwing the male screw 65 of the intermediate opening degree adjustment screw 7 retractively in the female screw hole 61 of the sleeve nut 9, therefore, the stress (internal distortion) which otherwise might be caused by tapping is prevented from being generated around or in the neighborhood of the female screw hole 61, i.e. around or in the neighborhood of the fitting bosses 57, 58. Also, even in the case where a repetitive shock load is imposed from the U-shaped hook 13 of the coil spring 6 on the forward end of the male screw 65 of the intermediate opening degree adjustment screw 7, the area of the resin portion (the fitting hole 59 of the fitting bosses 57, 58) subjected to the shock load is increased and therefore the shock resistance is improved for a higher reliability.

Second Embodiment

Figure 5:
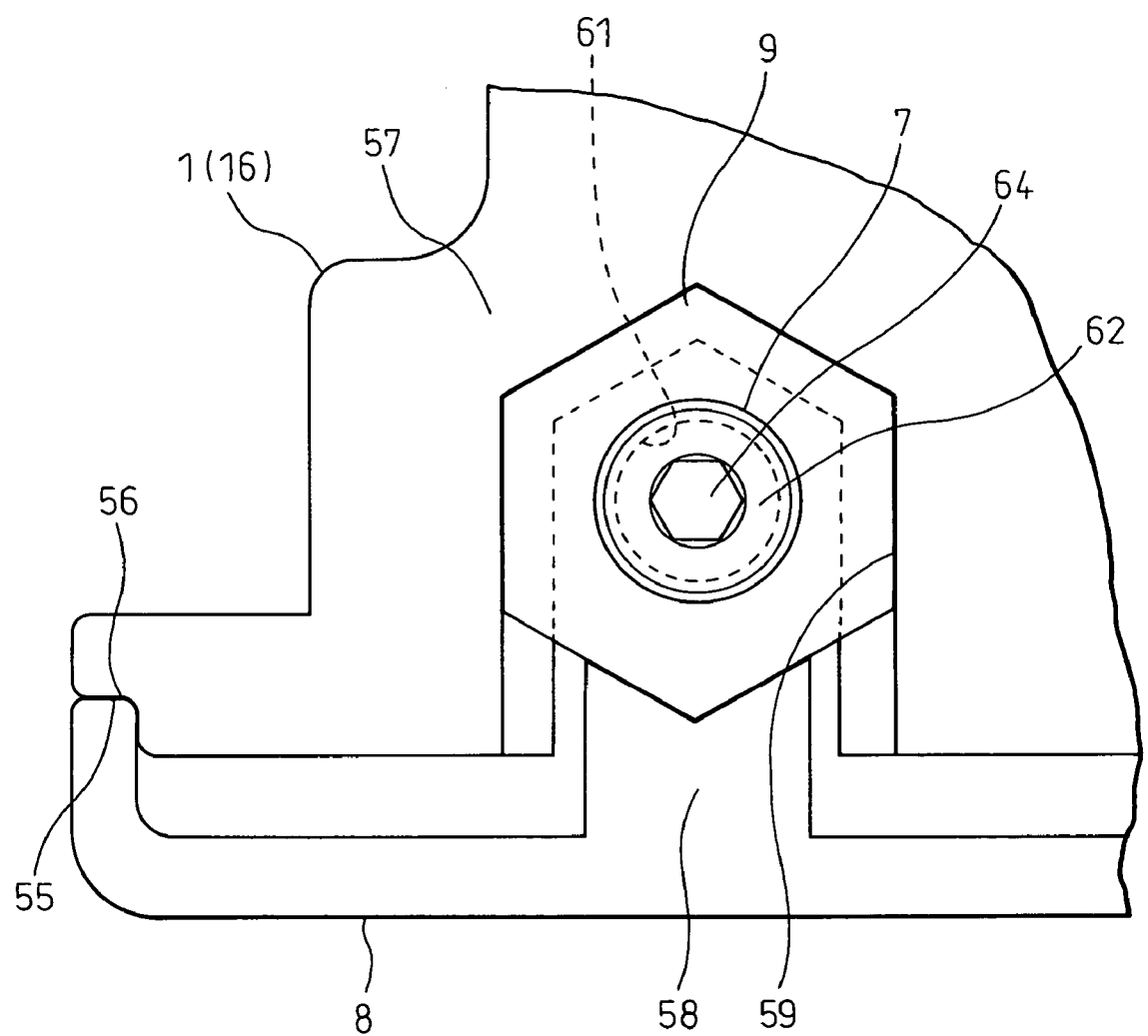
FIG. 5 is a plan view showing the coupling between a gear housing of a throttle body and a sensor cover according to a second embodiment of the invention.

FIG. 5 is a diagram showing the coupling between the gear housing of the throttle body and the sensor cover according to a second embodiment of the invention.

According to this embodiment, the sleeve nut 9 has a hexagonal outer diametrical shape on the one hand, and the fitting boss 57 of the gear housing 16 of the throttle body 1, the fitting boss 58 of the sensor cover 8 and the fitting hole 59 formed between the fitting bosses 57, 58 have an inner diametrical shape corresponding to the outer diametrical shape of the sleeve nut 9. Also in this case, the area of the resin portion (the fitting hole 59 of the fitting bosses 57, 58) subjected to the repetitive shock load from the U-shaped hook 13 of the coil spring 6 is increased, and therefore the shock resistance is improved for a higher reliability.

Third Embodiment

Figure 6:
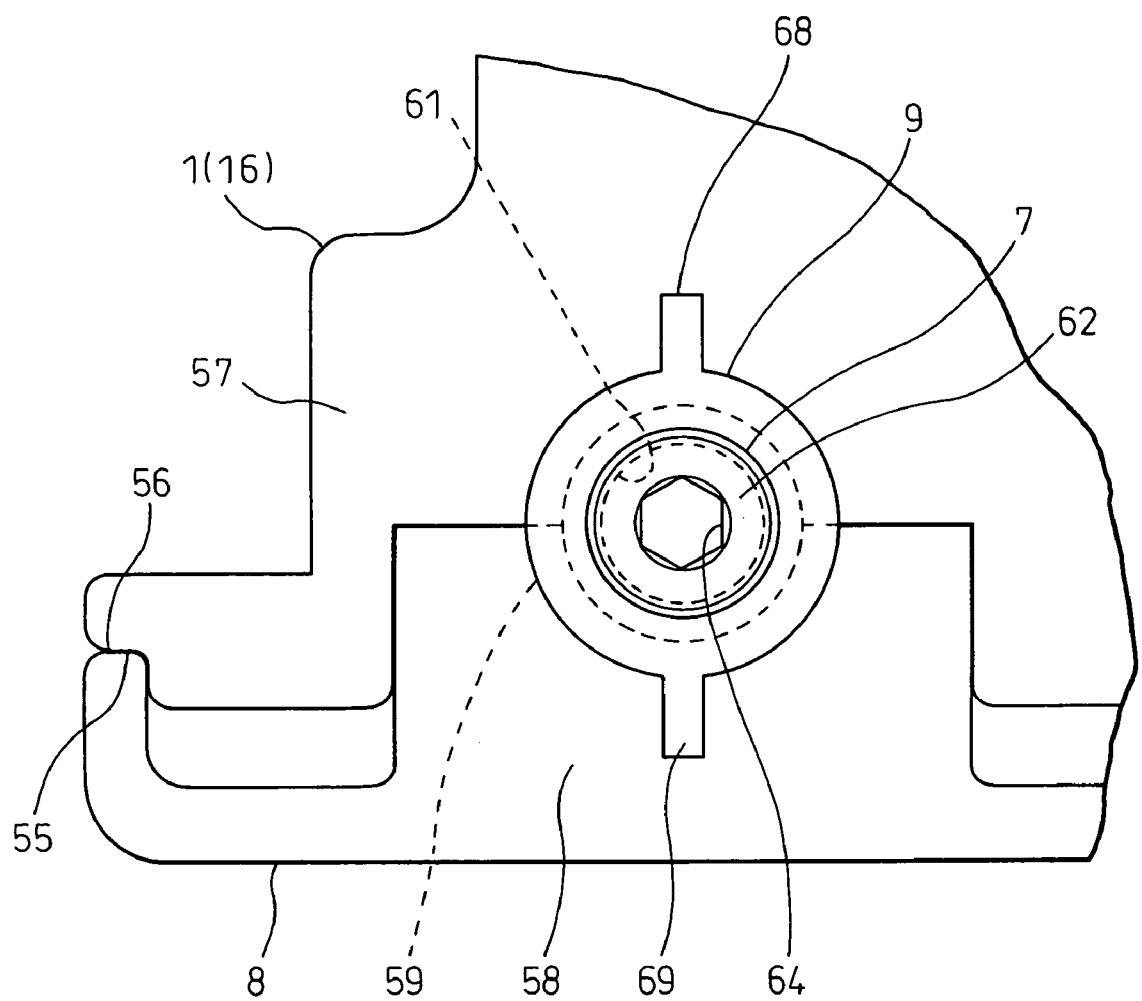
FIG. 6 is a plan view showing the coupling between a gear housing of a throttle body and a sensor cover according to a third embodiment of the invention.

FIG. 6 is a diagram showing the coupling between the gear housing of the throttle body and the sensor cover according to a third embodiment of the invention.

According to this embodiment, the outer peripheral portion of the sleeve nut 9 is formed with tabular fitting pieces 68, 69 projecting in two radial directions (in directions substantially perpendicular to the plane of the coupling surface between the opening-side end surface 55 and the coupling end surface 56). Also in this case, the area of the resin portion (the fitting hole 59 of the fitting bosses 57, 58) subjected to the repetitive shock load from the U-shaped hook 13 of the coil spring 6 is increased and, therefore, the shock resistance is improved for a higher reliability.

Fourth Embodiment

Figure 7:
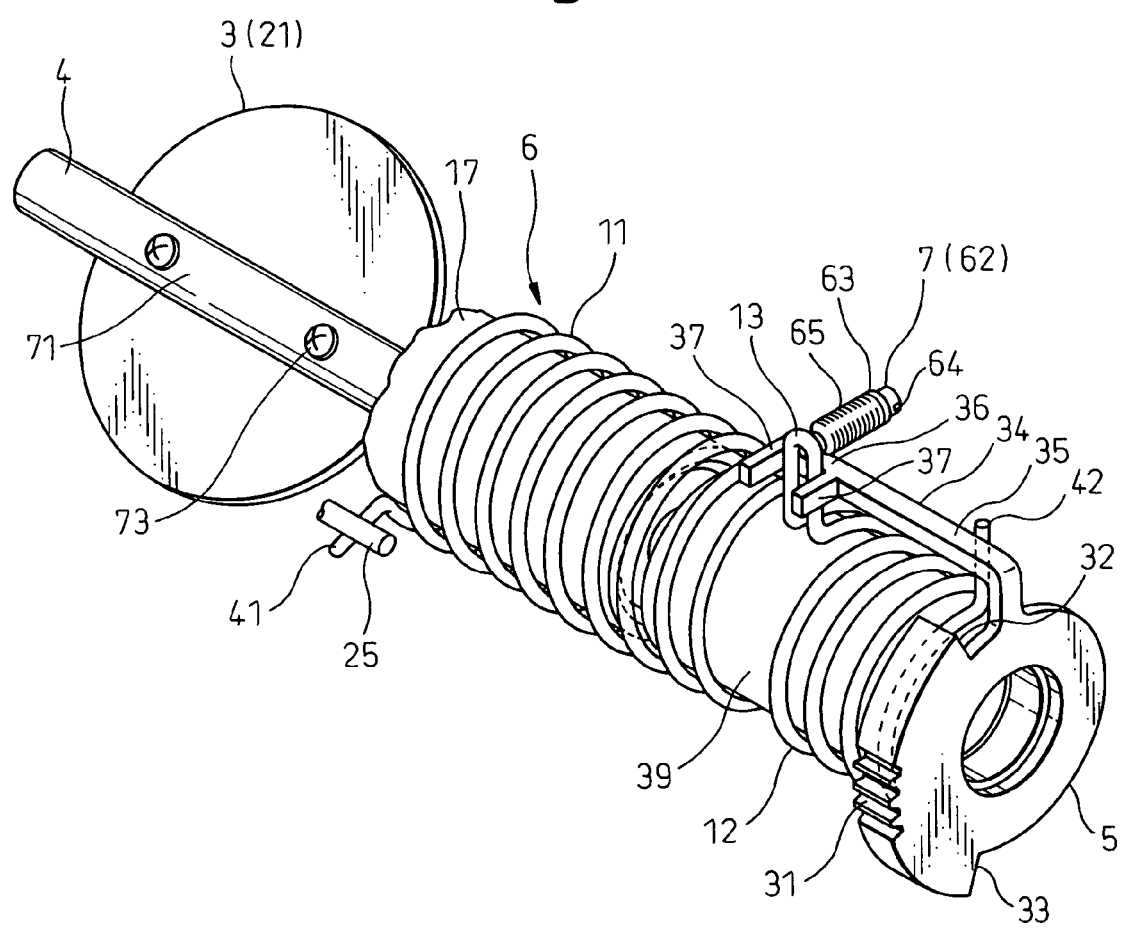
FIG. 7 is a perspective view showing a general structure of an electronically controlled throttle valve control unit according to a fourth embodiment of the invention.

A fourth embodiment of the invention is shown in FIGS. 7 and 8. FIG. 7 shows a general structure of the electronically controlled throttle valve control unit, and FIG. 8 the closed-up position, the intermediate position (default opening degree) and the full-open position of the throttle valve.

According to this embodiment, the throttle valve 3 has a disc portion 21 formed substantially in the shape of a disk of a metal or resin material. The throttle valve 3, while being inserted in the valve insertion hole 72 formed in the valve holder 71 of the throttle shaft 4, is fixedly fastened to the throttle shaft 4 using a fastening means 73 such as a fastening screw. As a result, the throttle valve 3 and the throttle shaft 4 can be integrated and rotated integrally with each other. Also, the screw head 62 of the intermediate opening degree adjustment screw 7 according to this embodiment is formed with a "+" or "−" shaped engaging groove 64 adapted to engage a fastening tool (such as the plus or minus screw driver) inserted in the female screw hole 61 of the sleeve nut 9 from outside the sensor cover 8.

In the electronically controlled throttle valve control unit according to this embodiment, in the case where the electric current to the drive motor is cut off for some reason (the drive motor powered off) or the electric current to the drive motor is stopped with engine stopped (the drive motor powered off), the throttle opening degree is set to the intermediate position (intermediate set opening degree or default opening degree) as shown in FIG. 8. One of the throttle opening degrees indicated by two-dot chains in FIG. 8 represents the closed-up position minimizing the gap between the outer peripheral end surface of the disc portion 21 of the throttle valve 3 and the throttle bore wall surface (diametrically inner surface of the bore) of the bore wall 14 of the throttle body 1. The other throttle valve opening degree indicated by the other two-dot chain in FIG. 8, on the other hand, represents the full-open position maximizing the gap between the outer peripheral end surface of the discal portion 21 of the throttle valve 3 and the throttle bore wall surface (diametrically inner surface of the bore) of the bore wall 14 of the throttle body 1.

Other Embodiments

In the embodiments described above, the opener lever 34 and the spring inner peripheral guide 39 are formed integrally with each other on the surface opposed to the valve gear (rotary drive member) 5 (the surface opposed to the outer wall surface of the bore wall 14) which is one of the component elements of the mechanical reduction gear (power transmission device) for transmitting the turning effort of the drive motor to the throttle valve 3. As an alternative, the opener member and the spring inner peripheral guide may are integrally formed on the outer periphery of the throttle shaft 4 rotated integrally with the throttle valve 3. In this case, the throttle shaft 4 makes up a rotary drive member for driving the throttle valve 3 in the direction toward the full-open position or in the direction toward the closed-up position. Also, in all the embodiments described above, the bore wall 14 forming the throttle bore 2 having a circular cross section is structured with a single pipe. As an alternative, the throttle bore of the throttle body 1 may be formed as a duplex pipe structure including an inner bore pipe (diametrically inner cylinder) forming the throttle bore 2 having a circular cross section and an outer bore pipe (diametrically outer cylinder) forming an annular space with the outer periphery of the inner bore pipe.

The discal portion 21 and the cylindrical portion 22 of the throttle valve 3 may be formed integrally of a composite resin material (polybutylene terephthalate containing 30% glass fiber; PBTG30, for example) composed of a heated and molten resin material (molten thermoplastic resin, for example) mixed with a filler (low-cost glass fiber, or carbon fiber, aramid fiber, boron fiber, etc.). Also, the bore wall 14 of the throttle body 1, the motor housing 15 and the gear housing 16 may be formed integrally of a composite resin material (polybutylene terephthalate containing 30% glass fiber; PBTG30, for example) composed of a heated and molten resin material (molten thermoplastic resin, for example) mixed with a filler (low-cost glass fiber, or carbon fiber, aramid fiber, boron fiber, etc.). Further, a resin throttle valve and a resin throttle body may be fabricated by injection molding of the aforementioned composite resin material. The resin components molded by injection molding of these resin composite material are inexpensive and have a high resin moldability with improved mechanical characteristics including high strength, rigidity and heat resistance.

The embodiments of the invention described above represent an example of an application to an electronically controlled throttle valve control unit, in which the turning effort of an actuator such as the drive motor is transmitted to the throttle shaft 4 through the mechanical reduction gear, and the rotational angle (valve opening degree) of the throttle valve 3 is controlled in accordance with the acceleration pedal angle set by the driver. As an alternative, this invention is applicable to the throttle device of the internal combustion engine without the drive motor, in which case the valve gear (rotary drive member) 5 arranged at an axial end of the throttle shaft 4 is replaced with an acceleration lever (rotary drive member) mechanically coupled to the acceleration pedal through a wire cable. Also by doing so, the acceleration pedal angle set by the driver can be transmitted to the throttle valve 3.

For the purpose of improving the coupling performance between the inner periphery of the cylindrical portion 22 of the throttle valve 3 and the outer periphery of the valve holder of the throttle shaft 4 and preventing the axial motion of the throttle valve 3 relative to the throttle shaft 4, i.e. for the purpose of preventing the throttle valve 3 from coming off from the valve holder of the throttle shaft 4, the outer peripheral surface of the valve holder of the throttle shaft 4 may be partly or wholly knurled. For example, the outer peripheral surface of the valve holder of the throttle shaft 4 may be notched or roughened. As another alternative, the valve holder of the throttle shaft 4 and the cylindrical portion 22 of the throttle valve 3 are formed to have a substantially circular cross section with a two-surface width. By doing so, the relative rotational motion of the throttle valve 3 and the throttle shaft 4 is prevented. Also, before the throttle body 1 and the throttle valve 3 are resin molded substantially at the same time in the same injection molding die as the throttle valve 3, the outer peripheral surface of the first and second bearing slide portions at the ends of the throttle shaft 4 may be coated with a release agent or a lubricant (such as a fluororesin or molybdenum disulfide).

According to this embodiment, the closed-up stopper 32 formed integrally on the outer periphery of the valve gear (rotary drive member) engages the closed-up stopper formed on the gear housing 16 of the throttle body 1 to restrict the rotation of the throttle valve in the direction toward the closed-up position. As an alternative, one or both end surfaces of the disc portion of the throttle valve 3 engage the closed-up stopper integrally resin-formed on the throttle bore wall surface (diametrically inner bore surface) of the bore wall 14 of the throttle body 1 to restrict the rotation of the throttle valve 3 in the direction toward the closed-up position. Also, according to this embodiment, the full-open stopper 33 formed integrally on the outer periphery of the valve gear (rotary drive member) 5 engages the full-open stopper formed on the housing 16 of the throttle body 1 to restrict the rotation of the throttle valve 3 in the direction toward the full-open position. As an alternative, one or both end surfaces of the discal portion of the throttle valve 3 engage the full-open stopper integrally resin-formed on the throttle bore wall surface (diametrically inner bore surface)

of the bore wall 14 of the throttle body 1 to restrict the rotation of the throttle valve 3 in the direction toward the full-open position.

Figure 11:
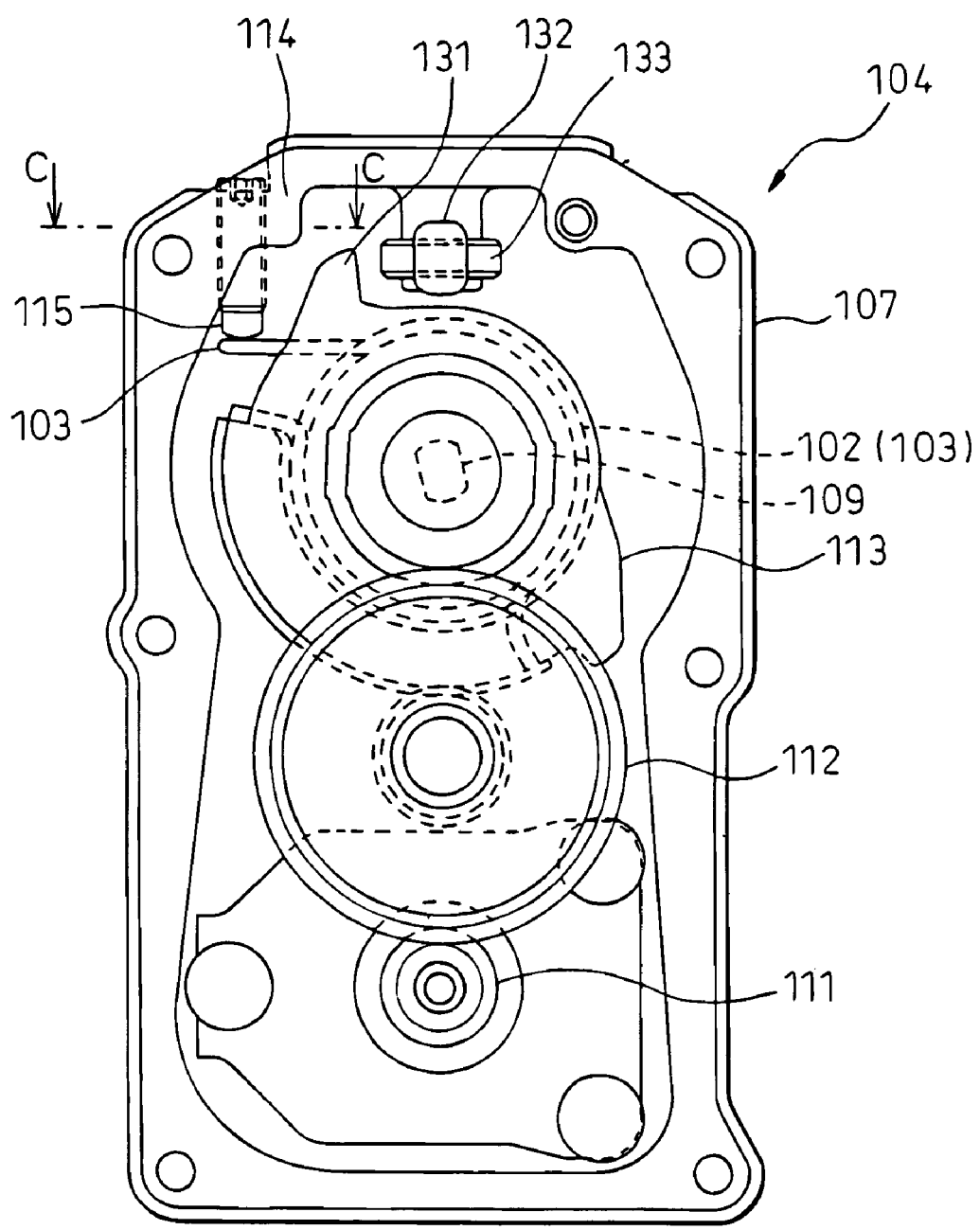
FIG. 11 is a sectional view taken in line A-A in FIG. 9.
Figure 12:
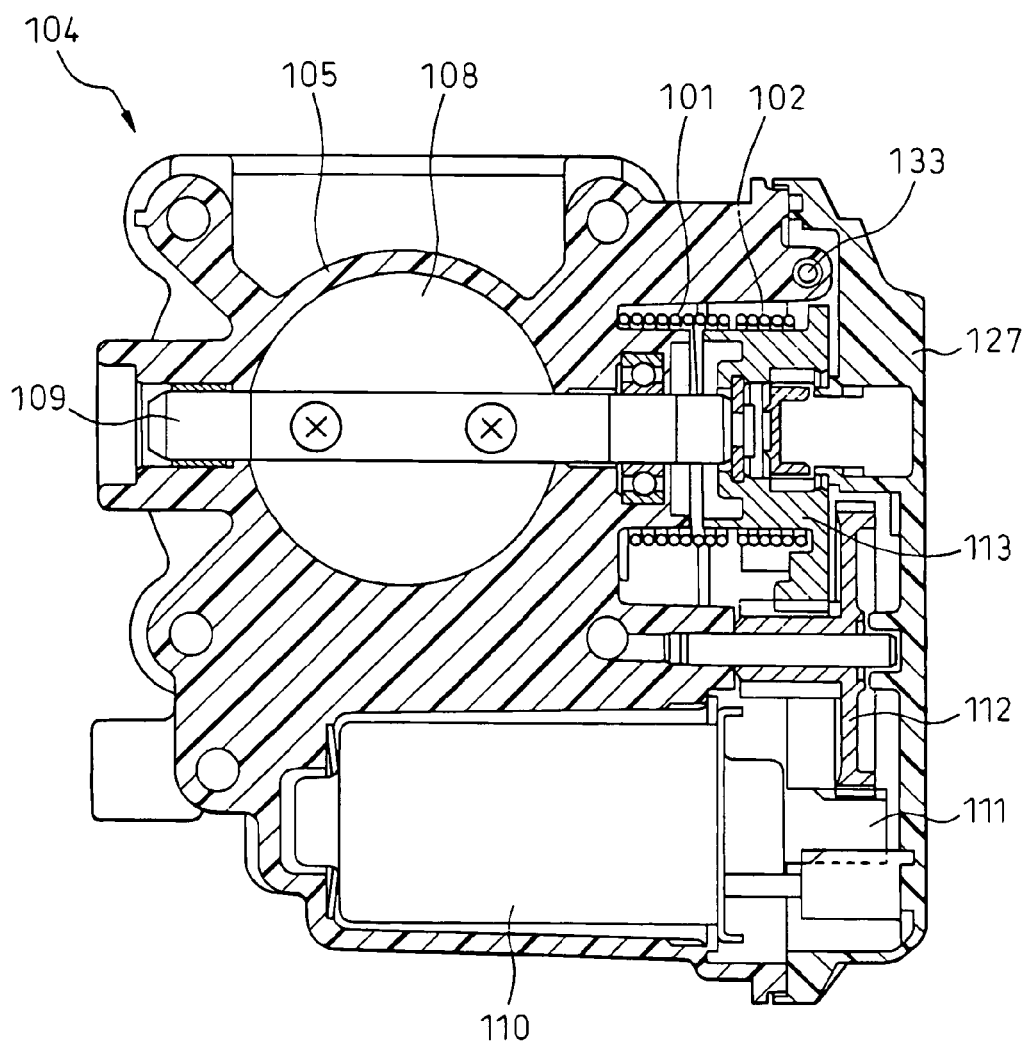
FIG. 12 is a sectional view taken in line B-B in FIG. 10.
Figure 13:
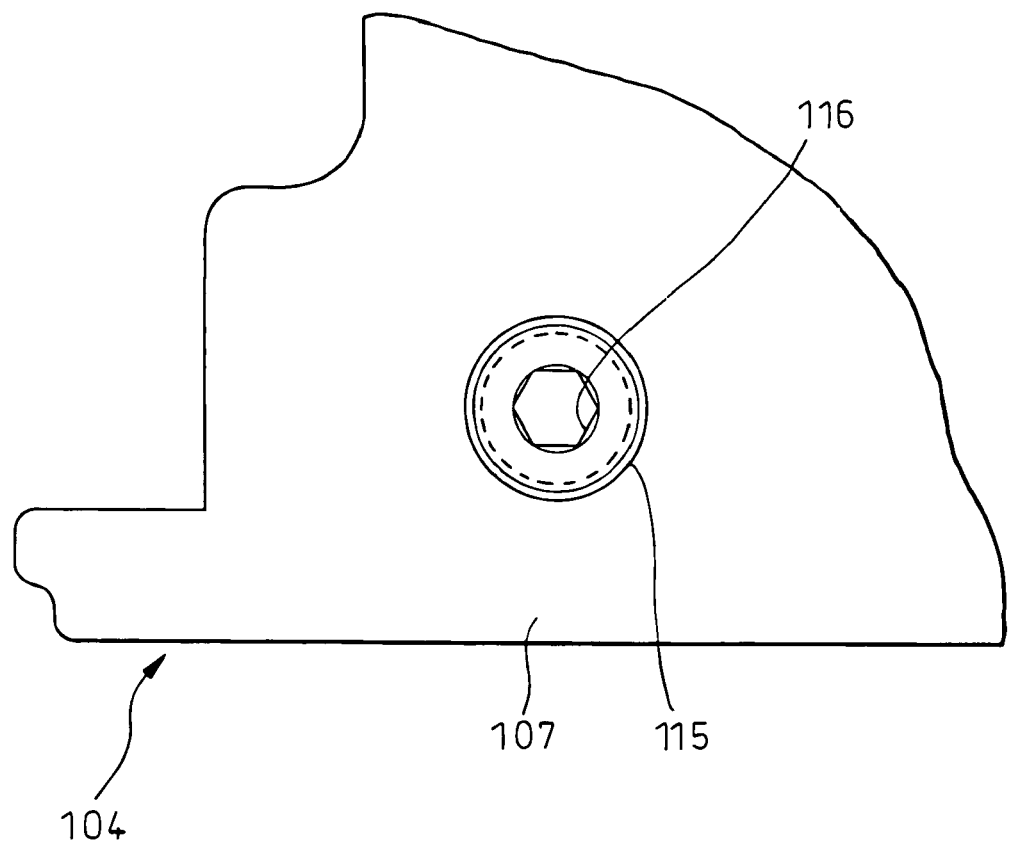
FIG. 13 is a sectional view taken in line C-C in FIG. 11.
Figure 14:
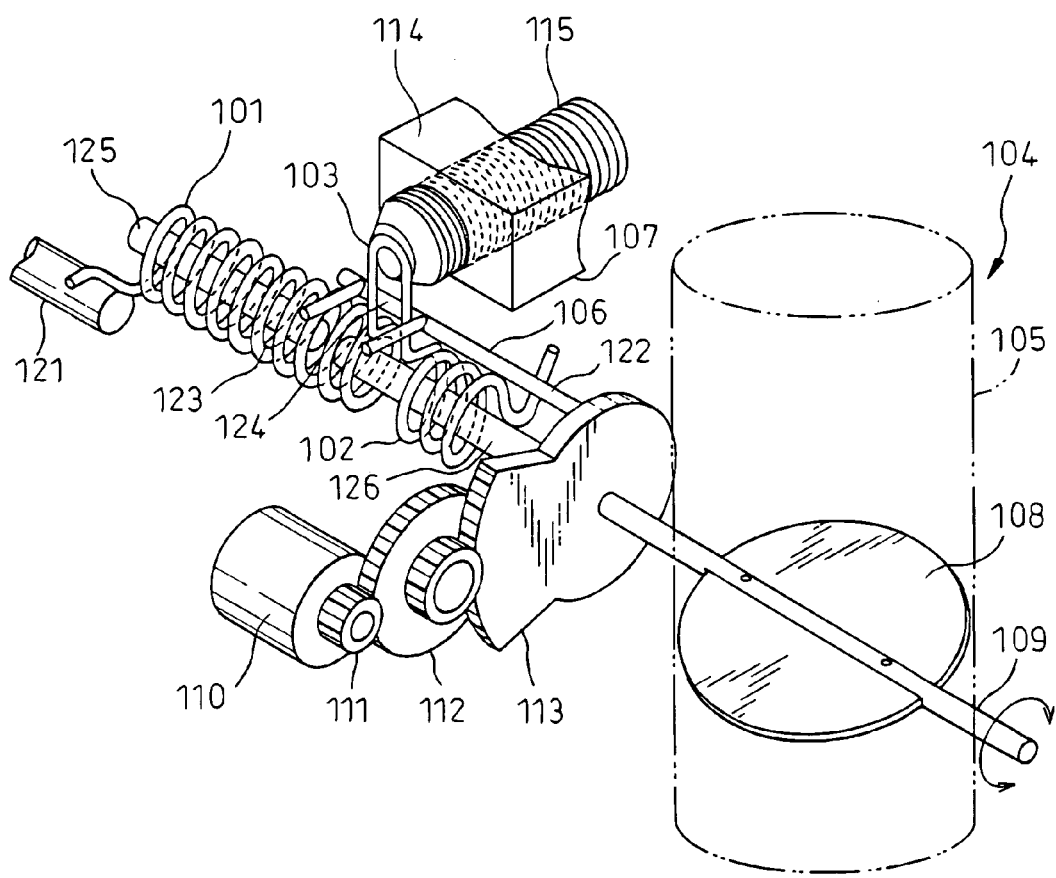
FIG. 14 is a perspective view showing a general structure of the conventional electronically controlled throttle valve control unit.

Also, the electronically controlled throttle valve control unit according to a comparative example includes a closed-up opening degree adjustment mechanism (idle opening degree adjustment mechanism) in which, as shown in FIG. 11, the closed-up stopper 131 formed integrally on the outer periphery of the valve gear 113 engages the forward end of the tapping screw (closed-up opening degree adjustment screw) forced into the closed-up stopper 132 formed on the gear housing 107 of the throttle body 104 to restrict the rotation of the throttle valve 108 in the direction toward the closed-up position. As an alternative, the closed-up opening degree adjustment mechanism may be replaced with the throttle opening degree adjustment mechanism (especially, the closed-up opening degree adjustment mechanism) according to the invention.

While the invention has been described by reference to specific embodiments chosen for purposes of illustration, it should be apparent that numerous modifications could be made thereto by those skilled in the art without departing from the basic concept and scope of the invention.

The invention claimed is:

1. An intake air control apparatus for an internal combustion engine, said apparatus comprising:
    a throttle valve for adjusting an amount of intake air introduced into the combustion chamber of the internal combustion engine;
    a rotary drive member for driving the throttle valve in the directions toward a full-open position and a closed-up position;
    a coil spring for activating the throttle valve in the directions toward the closed-up position and the full-open position;
    a throttle bore for accommodating the throttle valve rotatably, and a throttle body having a recessed housing adjacent to the throttle bore;
    a housing cover forming a space for accommodating the rotary drive member and the coil spring with the housing, the housing cover having a coupling end surface adapted to be coupled to the opening-side end surface of the housing; and
    a throttle opening degree adjustment mechanism for adjusting the throttle opening degree corresponding to the rotational angle of the throttle valve to a set opening degree associated with predetermined operating conditions of the internal combustion engine;
    wherein the housing and the housing cover are formed of resin;
    wherein a selected one of the rotary drive member and the coil spring has a contact portion rotated integrally with the throttle valve;
    wherein the throttle opening degree adjustment mechanism includes a sleeve nut having an internal female screw hole along the axial line and fixedly held between the opening-side end surface of the housing and the coupling end surface of the housing cover, and a throttle opening degree adjustment screw screwed retractively into the female screw hole of the sleeve nut and coming into direct contact with the contact portion when the throttle opening degree is located within a set opening degree range thereby to restrict the rotation of the throttle valve to the set opening degree.

2. An intake air control apparatus for the internal combustion engine according to claim 1,
    wherein the sleeve nut is held between the opening-side end surface of the housing and the coupling end surface of the housing cover in opposed relation to the contact portion when the throttle opening degree is located within the set opening degree range in such a manner as to establish communication between the interior and the exterior of the space.

3. An intake air control apparatus for the internal combustion engine according to claim 1,
    wherein the throttle opening degree adjustment screw includes a head adapted to engage a tool inserted into the female screw hole of the sleeve nut from outside the space and an axial portion extending from the head toward the contact portion along in the axial direction, and
    wherein a male screw thread portion adapted to be screwed into the female screw hole of the sleeve nut is formed on the outer periphery of the axial portion.

4. An intake air control apparatus for the internal combustion engine according to claim 1, further comprising a drive motor for changing the throttle opening degree in accordance with the acceleration pedal angle set by the driver,
    wherein the throttle valve is a rotary valve of butterfly type in which the rotational axis is substantially perpendicular to the axis of the average flow of the intake air through the throttle bore having a circular cross section formed in the throttle bore, and the rotational angle is changed from the closed-up position minimizing the intake air amount and the full-open position maximizing the intake air amount, and
    wherein the rotary drive member is a valve gear making up one of the component elements of the mechanical reduction gear thereof for reducing the rotational speed of the output shaft of the drive motor to a predetermined reduction ratio, and the integrally arranged at one end of the throttle valve along the rotational axis.

5. An intake air control apparatus for the internal combustion engine according to claim 4,
    wherein the coil spring has both the function of a return spring to urge the throttle valve in the direction toward the closed-up position and the function of a default spring to urge the throttle valve back to the intermediate set opening degree from the idle opening degree,
    wherein the contact portion is a U-shaped hook formed by bending the coupling between the return spring and the default spring into the shape of an inverse U,
    wherein the throttle opening degree adjustment mechanism is an intermediate opening degree adjustment mechanism for adjusting the throttle opening degree to the intermediate set opening degree in the case where power to the drive motor is stopped for some reason, and
    wherein the throttle opening degree adjustment screw is an intermediate opening degree adjustment screw supported by being screwed in the female screw hole of the sleeve nut and coming into direct contact with the U-shaped hook in the case where the throttle opening degree changes to the intermediate set opening degree.

6. An intake air control apparatus for the internal combustion engine according to claim 4,
    wherein the space includes a spring chamber for accommodating the coil spring, a gear chamber for rotatably accommodating the gears of the mechanical reduction gear and a motor accommodating hole for accommodating and holding the drive motor, and wherein the housing cover is a sensor cover for fixedly holding the throttle opening degree sensor to detect the throttle opening degree.

7. An intake air control apparatus for the internal combustion engine according to claim 1, wherein the contact portion is a closed-up stopper portion formed in the shape of selected one of a block, a boss and a protrusion on the outer periphery of the rotary drive member, wherein the throttle opening degree adjustment mechanism is a closed-up opening degree adjustment mechanism for adjusting the throttle opening degree to the closed-up clearance of the internal combustion engine, and wherein the throttle opening degree adjustment screw is a closed-up opening degree adjustment screw which is held by being screwed in the female screw hole of the sleeve nut and which comes into direct contact with the closed-up stopper portion at the closed-up position of the throttle opening degree minimizing the intake air amount.

8. A method for reducing stress in a throttle valve assembly for an intake air control apparatus of an internal combustion engine, said assembly including a housing and housing cover formed of resin wherein said method comprises:

retractively screwing a throttle valve adjustment screw into a female screw hole of a sleeve nut and into direct contact with a contact portion of a selected one of a rotary drive member and a coil spring acting to drive the throttle valve in opposing directions when the throttle opening is located within a set range thereby to restrict rotation of the throttle valve to the set opening degree.

* * * * *